United States Patent
Park et al.

(10) Patent No.: US 9,538,555 B2
(45) Date of Patent: Jan. 3, 2017

(54) METHOD AND APPARATUS FOR ACCESSING CHANNEL IN WIRELESS LAN

(71) Applicant: LG ELECTRONICS INC., Seoul (KR)

(72) Inventors: Giwon Park, Seoul (KR); Kiseon Ryu, Seoul (KR); Jinsoo Choi, Seoul (KR); Jinsam Kwak, Seoul (KR); Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 14/419,228

(22) PCT Filed: Aug. 14, 2013

(86) PCT No.: PCT/KR2013/007348
§ 371 (c)(1),
(2) Date: Feb. 2, 2015

(87) PCT Pub. No.: WO2014/027847
PCT Pub. Date: Feb. 20, 2014

(65) Prior Publication Data
US 2015/0208444 A1 Jul. 23, 2015

Related U.S. Application Data

(60) Provisional application No. 61/684,121, filed on Aug. 16, 2012, provisional application No. 61/691,804, (Continued)

(51) Int. Cl.
*H04W 4/00* (2009.01)
*H04W 74/08* (2009.01)
(Continued)

(52) U.S. Cl.
CPC ...... *H04W 74/0833* (2013.01); *H04W 74/0808* (2013.01); *H04W 74/006* (2013.01); *H04W 84/12* (2013.01)

(58) Field of Classification Search
CPC ....... H04W 72/04; H04W 88/08; H04W 76/00
See application file for complete search history.

(56) References Cited

U.S. PATENT DOCUMENTS

2006/0114928 A1* 6/2006 Utsunomiya ..... H04W 74/0808
370/448
2006/0291402 A1 12/2006 Yun et al.
(Continued)

FOREIGN PATENT DOCUMENTS

| KR | 10-2005-0065123 | 6/2005 |
| KR | 10-2012-0037176 | 4/2012 |
| WO | 2011/095669 | 8/2011 |

OTHER PUBLICATIONS

PCT International Application No. PCT/KR2013/007348, Written Opinion of the International Searching Authority dated Nov. 29, 2013, 1 page.

*Primary Examiner* — Michael J Moore, Jr.
*Assistant Examiner* — Siren Wei
(74) *Attorney, Agent, or Firm* — Lee, Hong, Degerman, Kang & Waimey PC

(57) ABSTRACT

Disclosed are a method and an apparatus for accessing a channel in a wireless LAN. A method for a station (STA) initially accessing the channel in the wireless LAN comprises the steps of: the STA receiving from an access point (AP) a frame including channel state information and a set of an N (a natural number wherein N>1) number of access parameter sets; the STA selecting a random variable when the channel state information indicates that a wireless link is busy; the STA selecting one access parameter set from the N number of access parameter sets on the basis of the one (Continued)

access parameter and transmitting an association request frame to the AP.

14 Claims, 21 Drawing Sheets

Related U.S. Application Data filed on Aug. 22, 2012, provisional application No. 61/692,713, filed on Aug. 24, 2012.

(51) Int. Cl.
*H04W 84/12* (2009.01)
*H04W 74/00* (2009.01)

(56) References Cited

U.S. PATENT DOCUMENTS

| | | | | |
|---|---|---|---|---|
| 2008/0056297 | A1* | 3/2008 | Gaur | H04W 74/0816 370/447 |
| 2011/0149795 | A1* | 6/2011 | Tanaka | H04L 12/2838 370/253 |
| 2011/0249580 | A1* | 10/2011 | Ikeda | H04L 41/0816 370/252 |
| 2013/0294354 | A1* | 11/2013 | Zhang | H04W 72/04 370/329 |

\* cited by examiner

FIG. 1
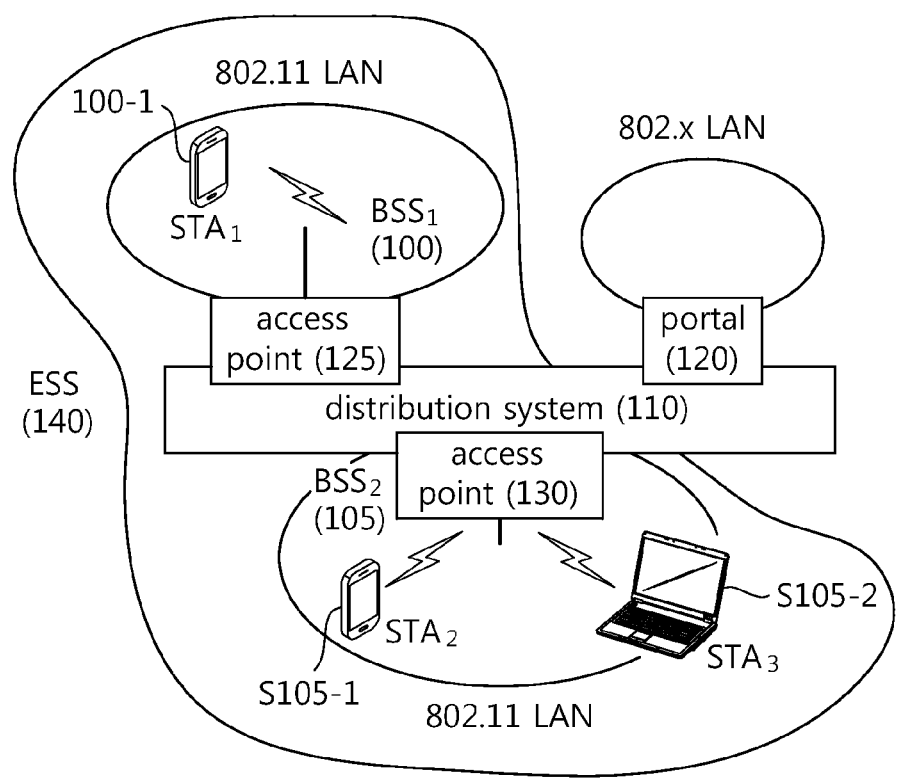
(A)
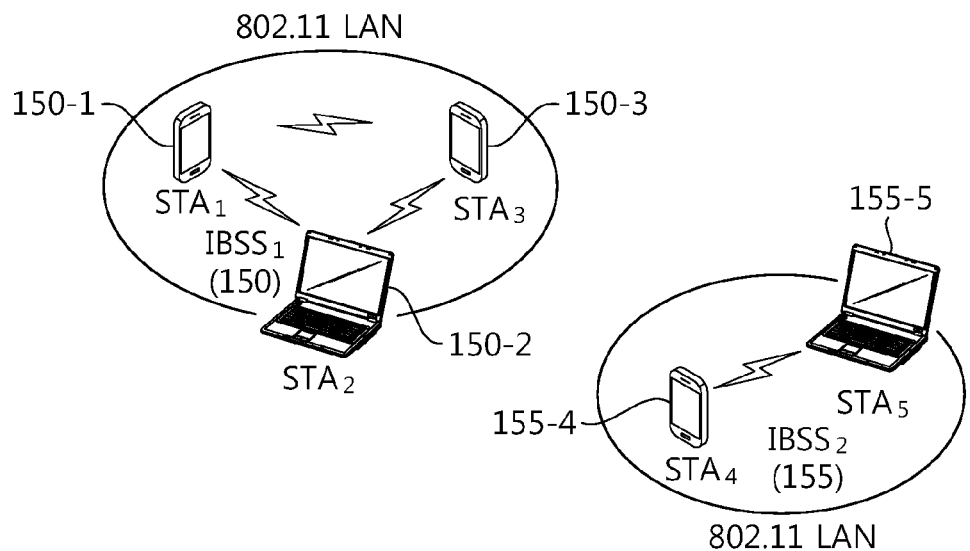
(B)

METHOD AND APPARATUS FOR ACCESSING CHANNEL IN WIRELESS LAN

CROSS-REFERENCE TO RELATED APPLICATIONS

This application is the National Stage filing under 35 U.S.C. 371 of International Application No. PCT/KR2013/007348, filed on Aug. 14, 2013, which claims the benefit of U.S. Provisional Application Ser. No. 61/684,121, filed on Aug. 16, 2012, Ser. No. 61/691,804, filed on Aug. 22, 2012 and Ser. No. 61/692,713, filed on Aug. 24, 2012, the contents of which are all hereby incorporated by reference herein in their entirety.

BACKGROUND OF THE INVENTION

Field of the Invention

The present invention relates to a method and apparatus for a channel access and, more particularly, to a method and apparatus for a channel access by a station (STA).

Related Art

Recent Wireless LAN (WLAN) technology is basically evolving into three directions. There are Institute of Electrical and Electronic Engineers (IEEE) 802.11ac and IEEE 802.11 ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11ai standardization is recently carried out actively.

IEEE 802.11ai is MAC technology in which a rapid authentication procedure is handled in order to significantly reduce the initial setup and association time of a WLAN, and standardization activities for IEEE 802.11ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a method for a channel access.

Another object of the present invention is to provide an apparatus for performing a method for a channel access.

In an aspect, a method for an initial channel access performed by a station (STA) in a wireless LAN is provided. The method may include receiving, by the STA, a frame including information of channel state and N (N>1) access parameter sets from an access point (AP), selecting, by the STA, a random variable, if the information of channel state indicates that a wireless link is congested, selecting, by the STA, one access parameter set among the N access parameter sets based on the random variable, and transmitting an association request frame to the AP by performing the initial channel access based on the one access parameter set, wherein each of the plurality of access parameter sets may include information of a contention window minimum (CWmin), a contention window maximum (CWmax) and an arbitration inter-frame space (AIFS) to perform the channel access by the STA.

In another aspect, station (STA) that performs scanning in a wireless LAN is provided. The STA may include a radio frequency (RF) unit receiving a wireless signal, and a processor selectively connected to the RF unit, wherein the processor is configured to perform, receiving a frame including information of channel state and N (N>1) access parameter sets from an access point (AP), selecting a random variable, if the information of channel state indicates that a wireless link is congested, selecting one access parameter set among the N access parameter sets based on the random variable, and transmitting an association request frame to the AP by performing the initial channel access based on the one access parameter set, wherein each of the plurality of access parameter sets may include information of a contention window minimum (CWmin), a contention window maximum (CWmax) and an arbitration inter-frame space (AIFS) to perform the channel access by the STA.

An initial access procedure can be quickly performed.

BRIEF DESCRIPTION OF THE DRAWINGS

FIG. 1 is a conceptual diagram illustrating the configuration of a Wireless Local Area Network (WLAN).

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
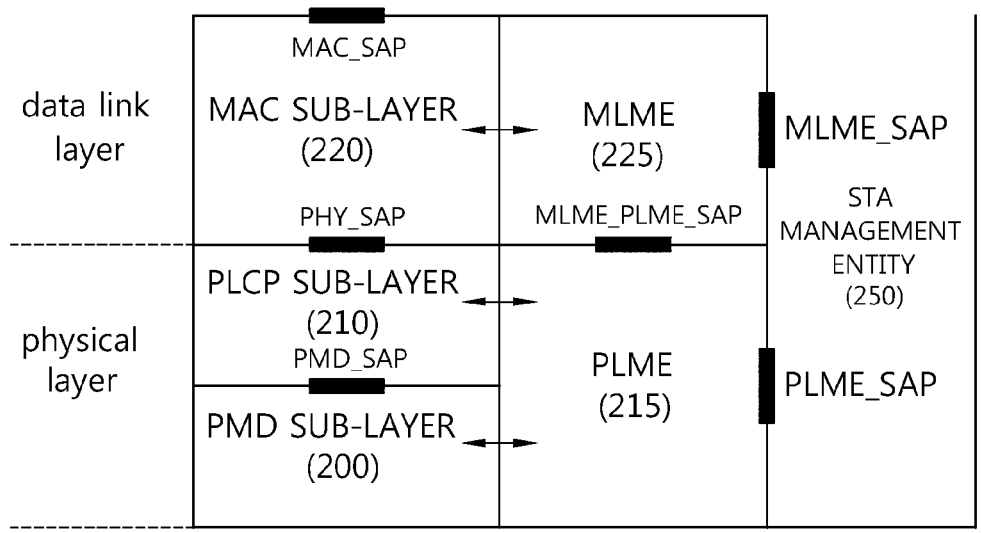
FIG. 2 is a diagram illustrating the hierarchical architecture of a WLAN system that is supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
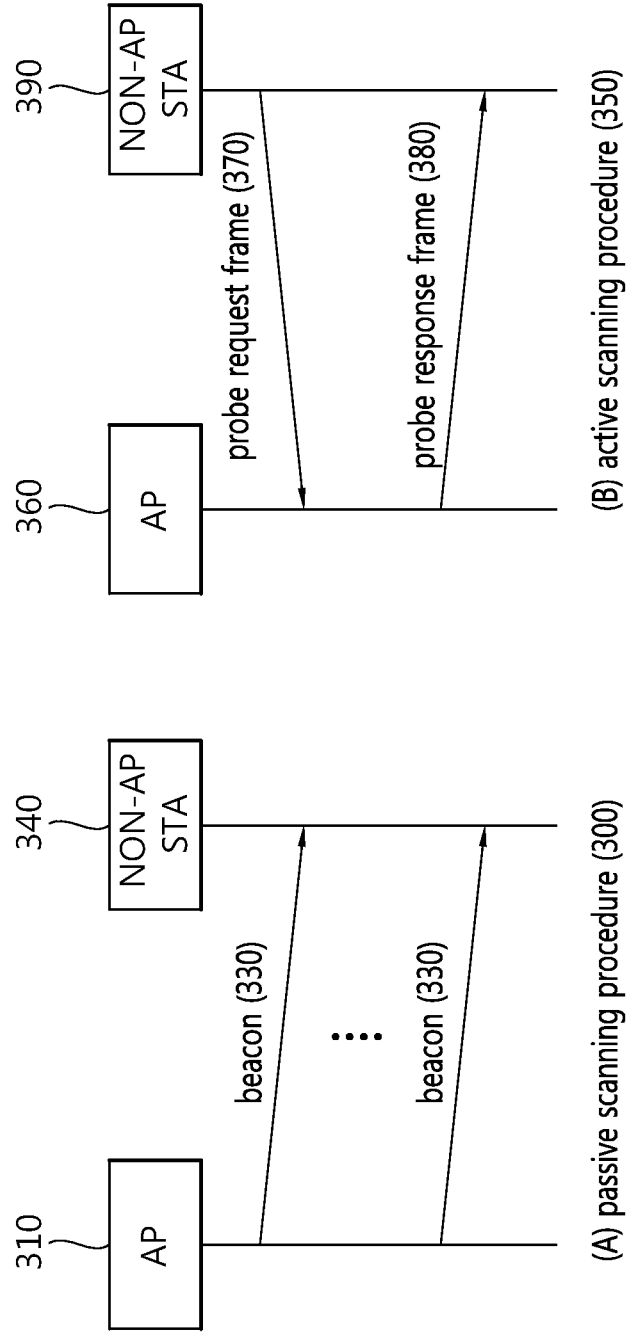
FIG. 3 is a conceptual diagram illustrating a scanning method in a WLAN.

FIG. 3 is a concept view illustrating a scanning method in a WLAN.

Referring to FIG. 3, the scanning method may be divided into passive scanning 300 and active scanning 350.

Referring to FIG. 3(A), the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to FIG. 3(B), the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
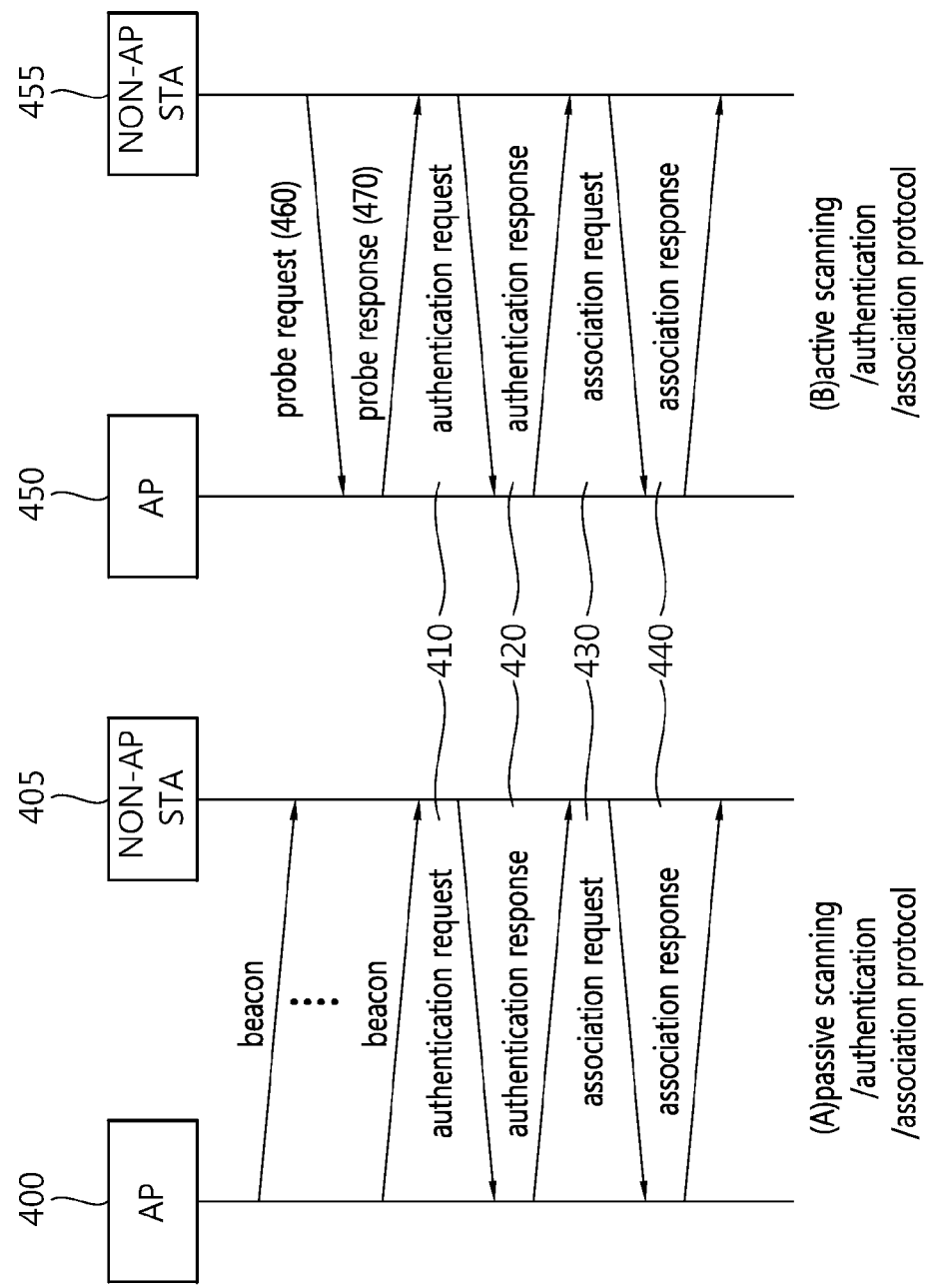
FIG. 4 is a conceptual diagram illustrating authentication and association processes after the scanning of an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
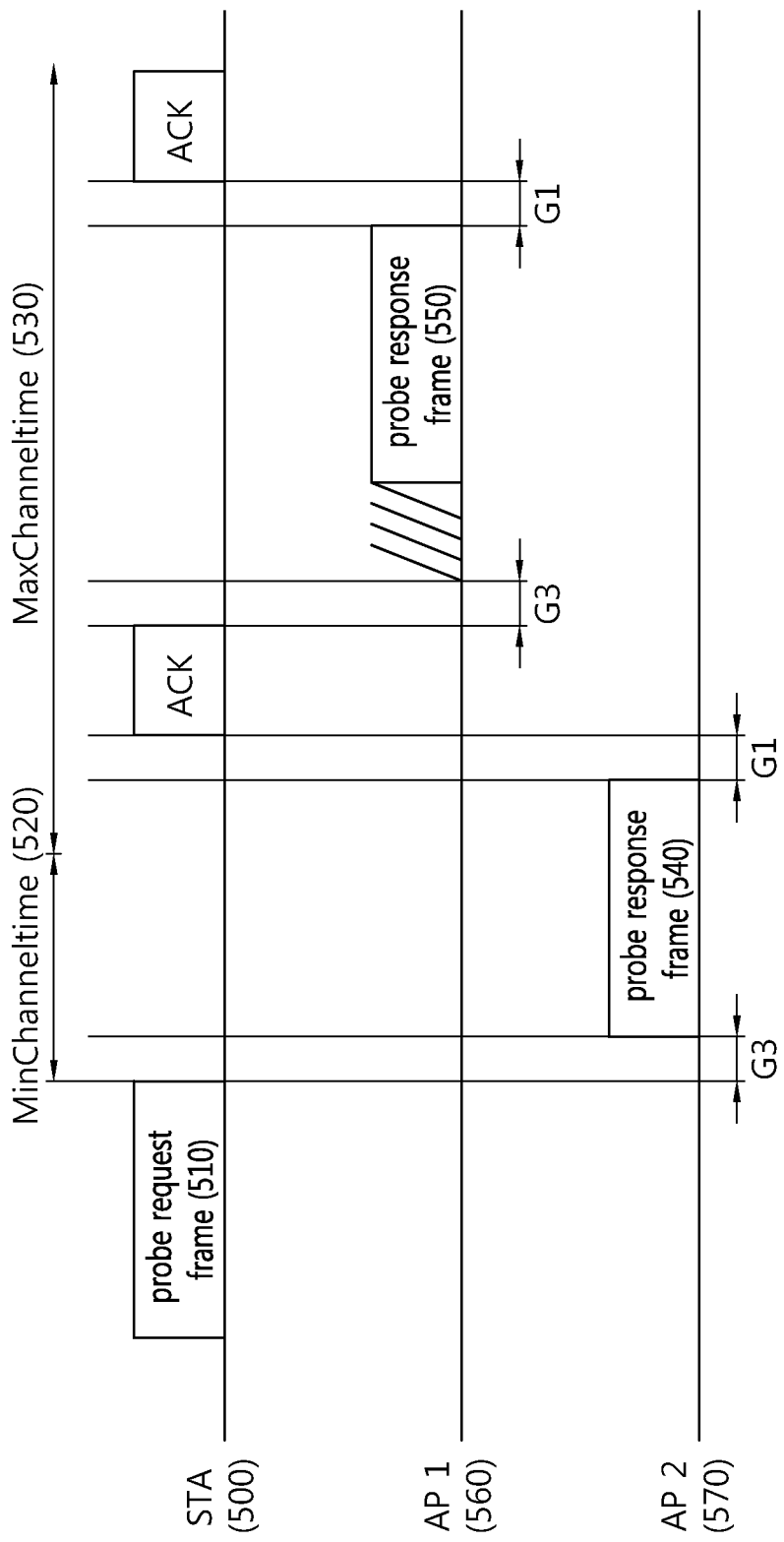
FIG. 5 is a conceptual diagram illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the probe timer reaches the minimum channel time 520, the STA 500 shifts scanning channels to perform scanning on other channel. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingServiceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
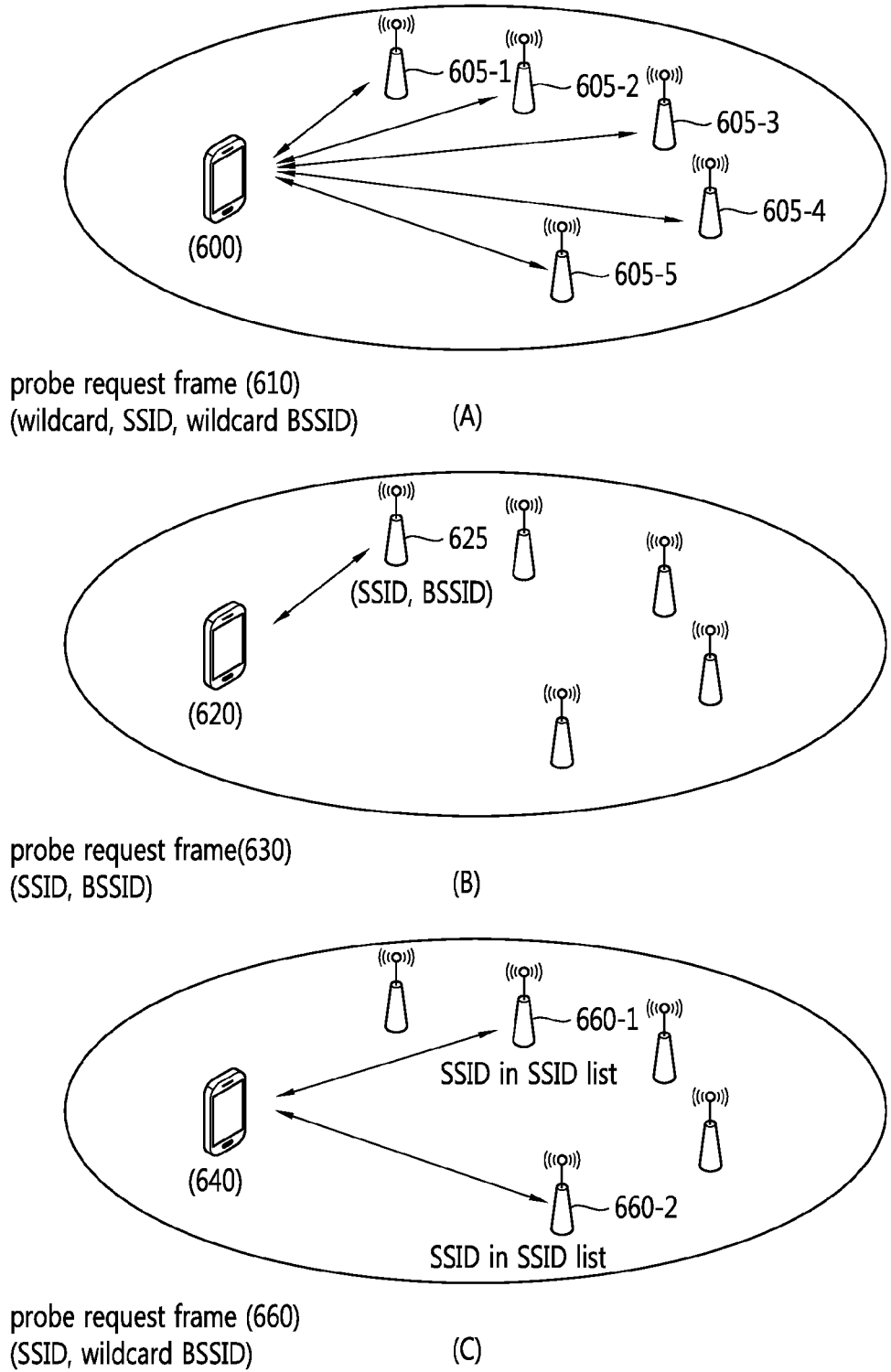
FIG. 6 is a conceptual diagram illustrating a method of transmitting a probe request frame.

FIG. 6 is a concept view illustrating a probe request frame transmission method.

FIG. 6 discloses methods of broadcasting, multicasting, and unicasting probe request frames from an STA.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

In performing the scanning procedure, the STA may sense a channel during the probe delay interval and sense if there is a frame received through the channel.

The conventional active scanning procedure will be described in detail below. The STA may receive an MLME-SCAN-request primitive that instruct an active scanning generated in the MLME. The STA may determine a method (unicast, multicast or broadcast) for transmitting the probe request frame based on the MLME-SCAN-request primitive, and also, determine the BSSID and SSID that will be included in the probe request frame.

The STA may determine whether the probe delay time is terminated and a valid frame is received through the PHY layer of the STA. The probe delay may be used as a channel search interval which is used before transmitting the probe request frame by the STA that performs the active scanning. For example, in case that a valid frame is received through the PHY layer, the PHY layer of the STA may generate a specific primitive (e.g., PHYRxStart.indication primitive) and transmit it to the MAC layer. If the probe delay time is terminated and a valid frame is received through the PHY layer of the STA, the STA may perform the channel access to transmit the probe request frame to the channel. If the channel access is successful, the STA may transmit the probe request frame.

The STA may transmit the probe request frame and setup a probe timer. The STA may measure a channel state until the probe timer reaches a minimum channel time (MinChannelTime). In case that the measurement result of the channel state is not busy, the STA may setup the NAV to 0 and scan other channels. In case that the measurement result of the channel state is busy, the STA may receive the probe response frame from the channel until the probe timer reaches to a maximum channel time (MaxChannelTime). If the probe timer reaches the maximum channel time, the STA may process all of the received probe response frames. Whether the channel state that the STA senses is busy or not may be determined based on a PHY-CCA.indication primitive generated in the PHY layer of the STA.

Hereinafter, a wireless access method used in 802.11 will be introduced.

A plurality of STAs may share wireless medium based on a distributed coordination function (DCF) performed in the MAC layer. The DCF is based on a carrier sensing multiple access with collision avoidance (CSMA/CA). Alternatively, a plurality of STAs may share wireless medium based on request to send (RTS)/clear to send (CTS). The DCF may be configured to enable the plurality of STAs to share the wireless medium based on the operations below in detail.

Figure 7:
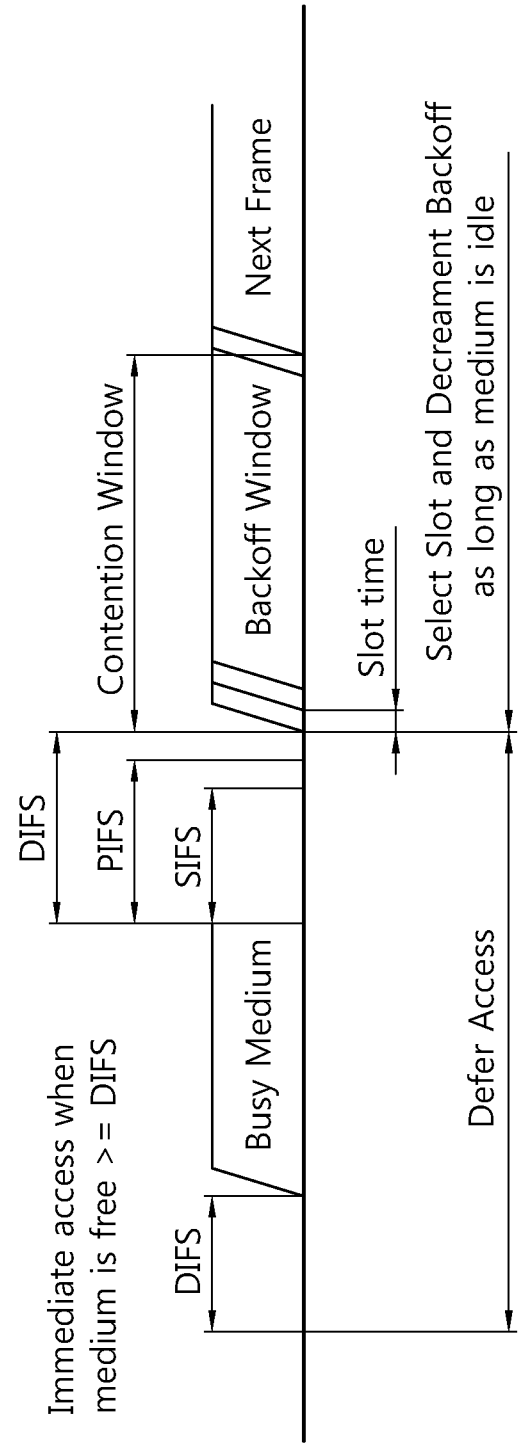
FIG. 7 is a conceptual diagram illustrating a method for a channel access by an STA based on DCF.

FIG. 7 is a concept view illustrating a channel access of a STA based on the DCF.

Generally, in the channel access based on the DCF if a medium is not used for a DIFS period or more (i.e., if the channel is idle during DIFS), an STA may transmit an immediate MPDU (MAC Protocol Data Unit). In case the medium is determined to be in use by a carrier sensing mechanism by the STA, the STA may determine the size of a CW (Contention Window) by a random backoff algorithm and may perform a backoff procedure. In order to perform the backoff procedure, the STA sets up the CW and selects some time slot. The selected time slots are called a backoff time. Among the backoff time selected by each of a plurality STAs, one STA selecting relatively short backoff time accesses more faster than the other STA selecting relatively long backoff time. The other STAs may stop the remaining backoff time and wait until the transmitting STA completes the transmission. After the frame transmission of the STA is complete, the other STAs conduct contention over the remaining backoff time to obtain the medium.

In other words, in case the STA gains access to a channel using the DCF, the STA may detect the channel state for a predetermined time. Specifically, the STA, in case the channel remains idle during DIFS( ), attempts transmission after a random backoff time. Such DCF-based transmission scheme plays a role to avoid a plurality of STAs from simultaneously performing transmission, thus preventing collision.

The random backoff time is a time period during which the channel waits before a frame is transmitted after waiting a predetermined time (for example, DIFS), and the random backoff time may be defined as in the following equation:

<Equation 1>

$$\text{Backoff time} = \text{Random}(\ ) \times \text{SlotTime} \qquad (1)$$

Random( )=an integer between 0 and CW

CW is an integer between CWmin and CWmax

That is, the STA may determine the CW based on a CWmin, which is a minimum CW time, and a CWmax, which is a maximum CW time. The STA may evaluate the back off time based on the determined CW.

Figure 8:
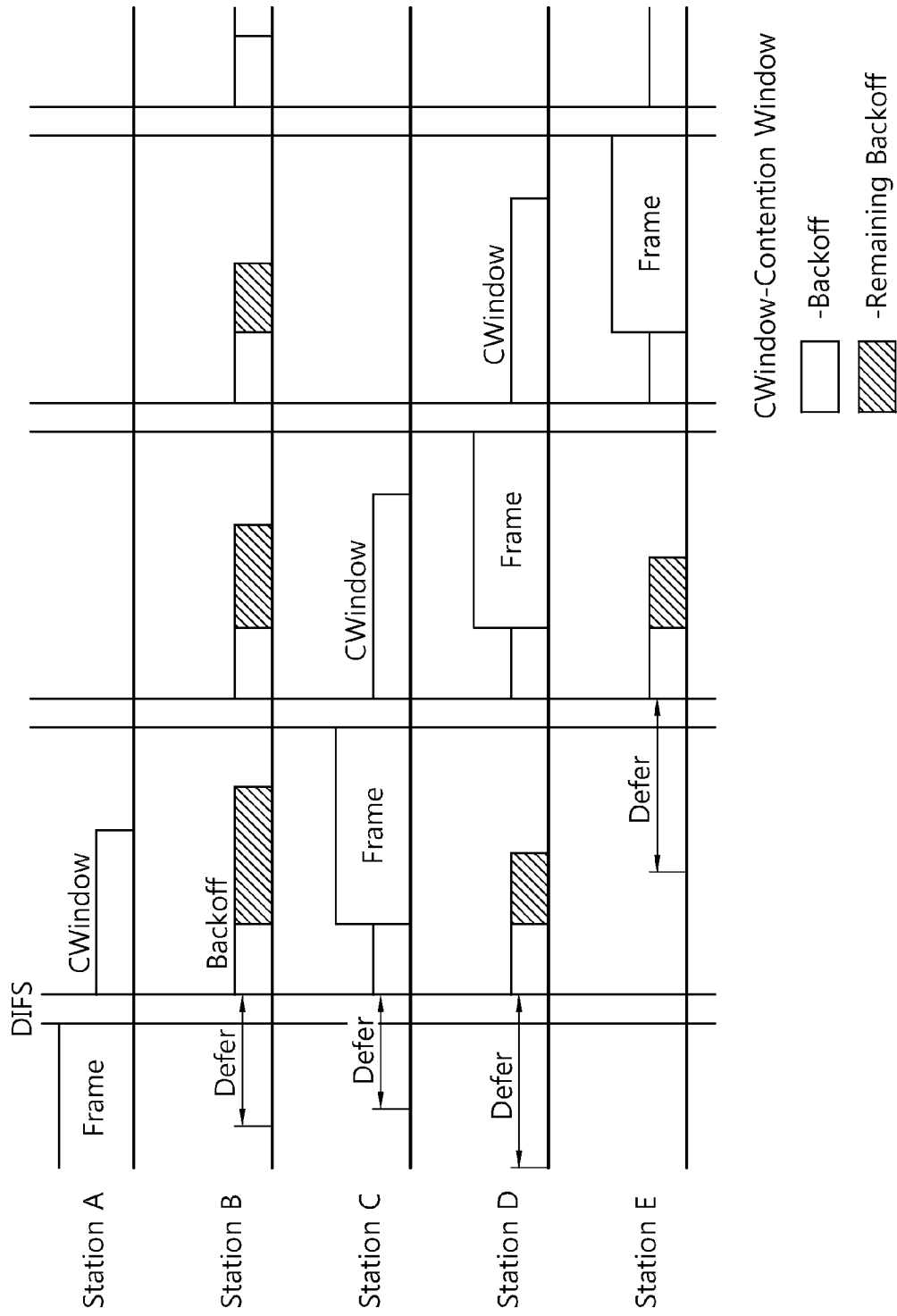
FIG. 8 is a conceptual diagram illustrating a back off procedure by a plurality of STAs.

FIG. 8 is a concept view illustrating a backoff procedure of a plurality of STAs.

Referring to FIG. 8, a backoff slot may occur after a medium is determined to be idle for a DIFS period. If no activity of the medium is detected after DIFS, the STA may reduce the backoff time based on aSlotTime. In case the medium is determined to be in use for the backoff slot, the STA might not reduce the backoff time. The frame transmission of the STA may be initiated whenever a set backoff timer is 0.

Further, the DCF transmission scheme includes an RTS/CTS access mode in which control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs at the MAC layer, a PCF (Point Coordination Function) may be defined. The above-described DCF is based on the CSMA/CA scheme and is thus not able to guarantee real-time transmission of data transmitted between an STA and an AP. In contrast, the PCF as the non-contention based transmission method may be used as a method for providing QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
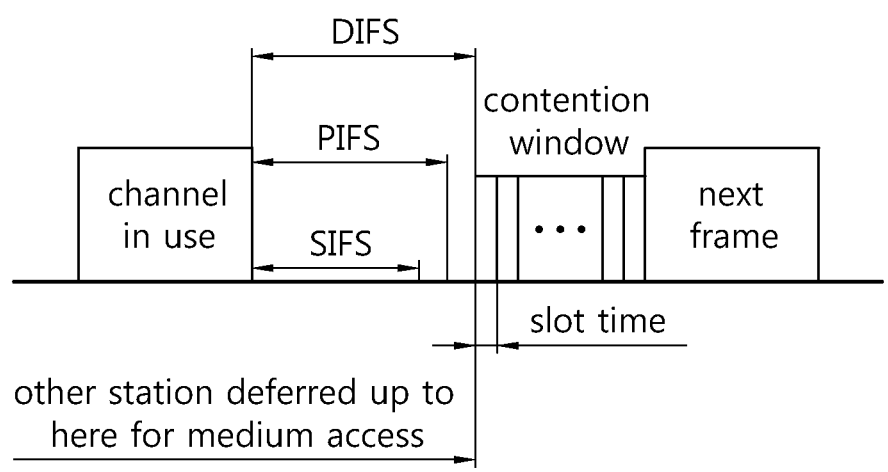
FIG. 9 is a conceptual diagram illustrating an interval between frames (IFS).

FIG. 9 is a concept view illustrating an interframe space (IFS).

Referring to FIG. 9, the interval between two frames may be referred to as an IFS. An STA may determine whether a channel is being used for a time period of the predefined IFS, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority
(2) PIFS (PCF IFS): used upon PCF frame transmission
(3) DIFS (DCF FIS): used upon DCF frame transmission
(4) EIFS (Extended IFS): used only when frame transmission error occurs. Not fixed interval In case only the DCF is used for a plurality of STAs to share a radio medium at the MAC layer, various problems may arise. For example, when the DCF is used, if a plurality of STAs simultaneously conduct initial access to an AP, collision frequently occurs between the plurality of STAs. Further, the DCF lacks the concept of transmission priority and is not thus able to guarantee QoS (Quality Of Service) for traffic data transmitted from an STA. To address such issues, 802.11e defines a new coordination function, HCF (Hybrid Coordination Function), to enhance the channel access capability of the existing DCF and HCF. The HCF defines two channel access schemes, HCCA (HCF Controlled Channel Access) and EDCA (Enhanced Distributed Channel Access), similar to those defined in 802.11 MAC.

The EDCA and HCCA defines traffic categories that are transmission priorities, and the EDCA and HCCA may determine priorities at which channel access is conducted. In other words, the EDCA and HCCA may determine channel access priorities depending on types of traffic data by mutually defining a CW and an IFS according to the category of traffic data transmitted from an STA.

For example, in case traffic data is an email, the data may be allocated to a low priority class. As another example, in case traffic data is a voice communication which needs the real-time transmission through a wireless LAN, channel access may be conducted, with the traffic data allocated to a high priority class.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an AIFS (Arbitration inter-Frame Space) that is shorter than the IFS that is a frame interval defined in the DCF. Further, the EDCA enables an STA to access a channel without contention during a period that is referred to as a TXOP (Transmit Opportunity). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 10:
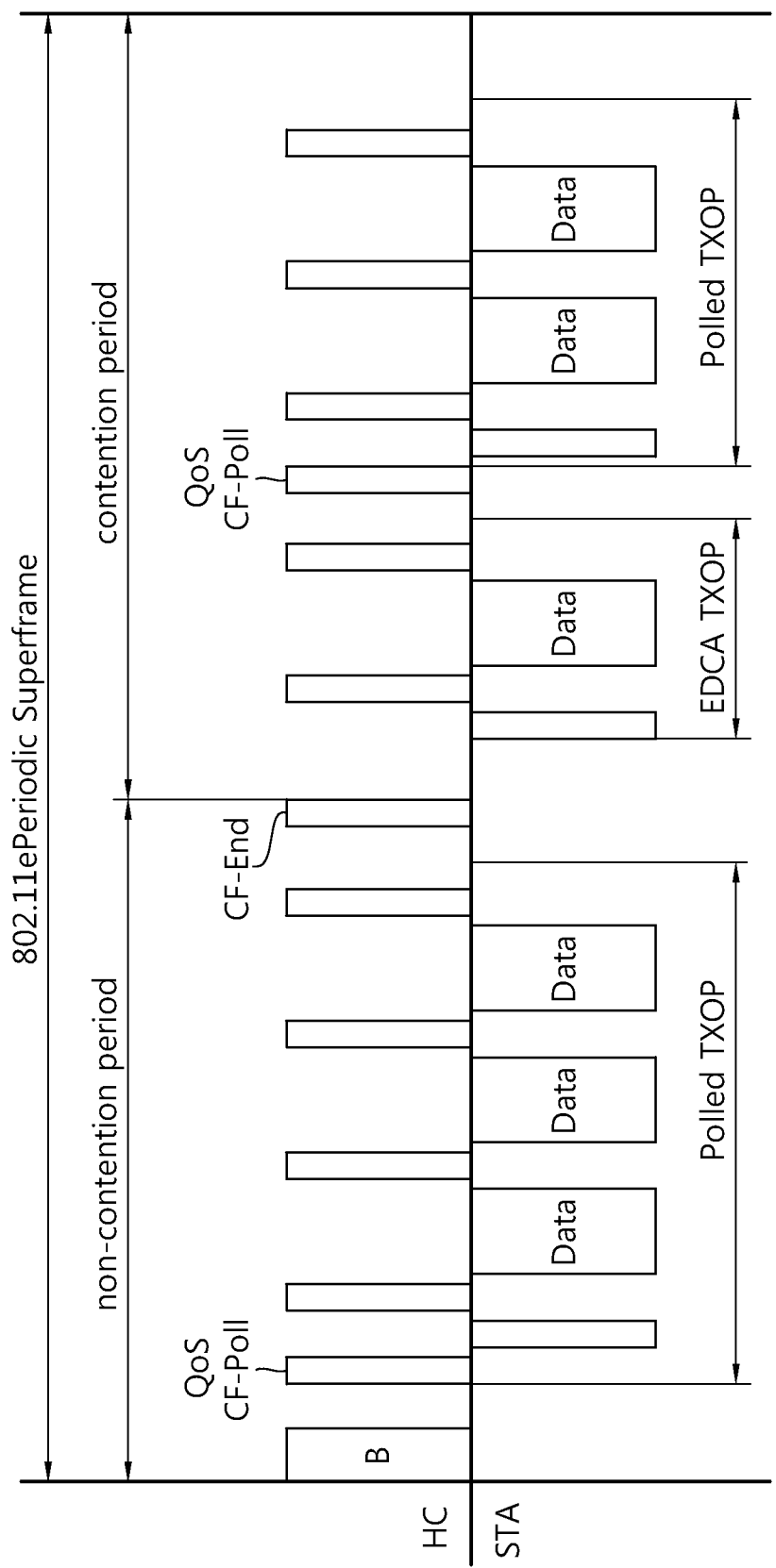
FIG. 10 is a conceptual diagram illustrating an acquiring method of TXOP by an STA.

FIG. 10 is a concept view illustrating a method of obtaining a TXOP by an STA.

Referring to FIG. 10, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

The EDCA and HCCA which are channel access schemes defined in the HCF are hereinafter described in greater detail.

(1) EDCA

In the EDCA scheme, channel access may be conducted with a plurality of user priorities (for example, 8 user priorities) defined for traffic data. For priority-based QoS data frame transmission, the EDCA defines four ACs (Access Categories: AC_BK, AC_BE, AC_VI, and AC_VO). The EDCA may, based on the ACs, map the traffic data arriving at the MAC layer with different user priorities as in the following <Table 2>.

Table 2 exemplifies the mapping between the user priorities and the ACs.

TABLE 2

| Priority | User Priority | AC(access category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC (access category, access class) parameter may be defined for each AC. The differences in transmission priority between the ACs may be implemented based on the AC parameter values set to be different from each other. The AC parameters are information on access parameters to determine a channel access method according to each of a plurality of ACs. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin[AC] decrease, a higher priority is given, and accordingly, the channel access delay shortens, thus allowing for use of more bands in a given traffic environment.

In case a collision occurs between the STAs while the STA transmits a frame, an EDCA backoff procedure of generating a new backoff counter is similar to the existing DCF backoff procedure, and differentiated backoff procedures for each AC may be performed based on different EDCA parameters. The EDCA parameters is becoming a critical means to differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 11:
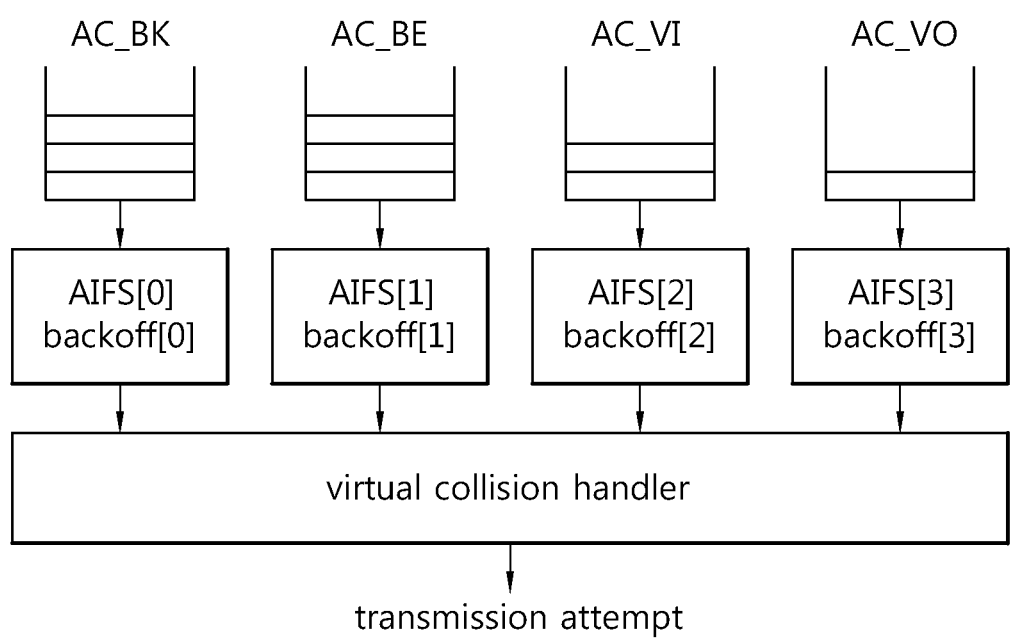
FIG. 11 is a conceptual diagram illustrating an EDCA channel reference model.

FIG. 11 is a concept view illustrating an EDCA channel reference model.

Referring to FIG. 11, the transmission queue for each of the four ACs defined in 802.11e MAC may play a role as an individual EDCA contention entity for radio medium access in one STA. One AC may retain an independent backoff counter with its own AIFS value. If there are one or more ACs that have simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 12:
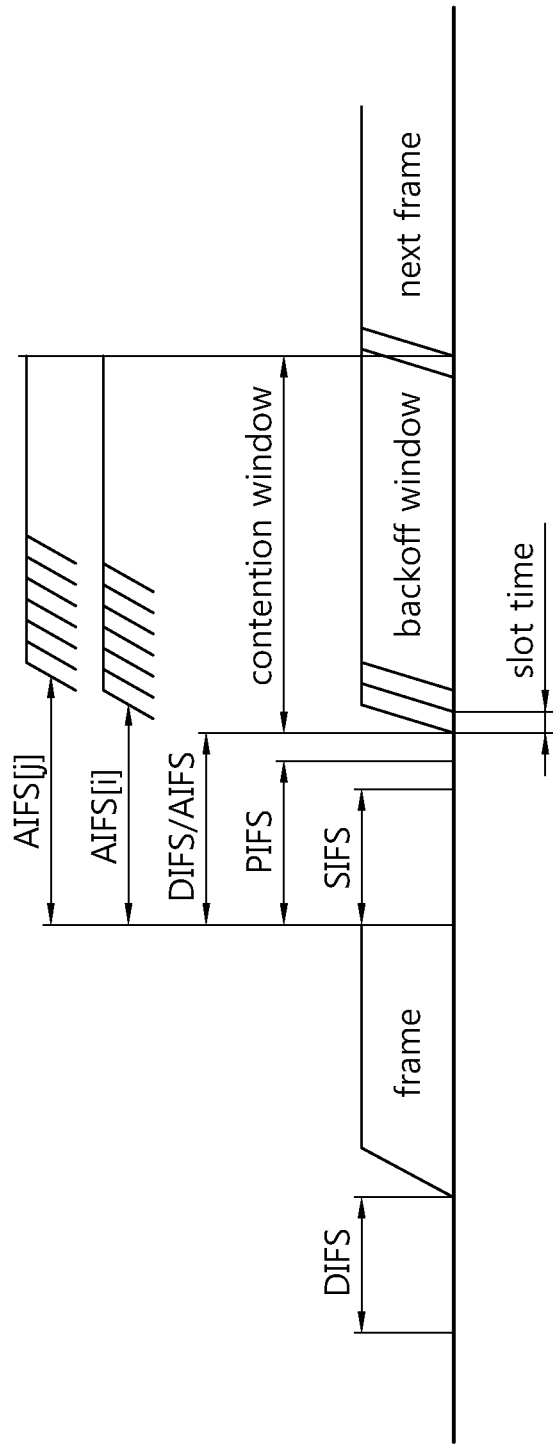
FIG. 12 is a conceptual diagram illustrating a back off procedure of EDCA.

FIG. 12 is a concept view illustrating a backoff procedure of an EDCA.

Referring to FIG. 12, each traffic data transmitted from an STA has a priority, and a backoff procedure may be conducted based on a contentious EDCA scheme. For example, the priorities respectively assigned to the traffics, as set forth above in Table 2, may be separated into eight, for example. As described above, one STA has different output queues depending on priorities, and each output queue is operated according to the EDCA rules. Each output queue may transmit traffic data using different AIFSs (Arbitration Interframe Spaces) according to each priority instead of the conventionally used DIFSs (DCF Interframe Spaces). Further, in case STAs are supposed to transmit traffics having different priorities at the same time, a traffic having a higher priority is transmitted earlier than the others, preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

$$T_b[i] = \text{Random}(i) \times \text{SlotTime} \qquad \text{<Equation 2>}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window CWnew[i] is computed using the following Equation 3 including a previous window CWold[i]:

$$CW_{new}[i] = ((CW_{old}[i]+1) \times PF) - 1 \qquad \text{<Equation 3>}$$

Here, PF is computed according to the procedure defined in the IEEE 802.11e standard. CWmin[i], AIFS[i], and PF value may be transmitted from the AP using a QoS parameter set element that is a management frame.

(2) HCCA

The HCCA protocol uses an HC (Hyper Coordinator) that is positioned in an AP for centralized management on radio medium access. Since the HC performs integrated and centralized management on the radio medium, contention over radio medium access between STAs may be reduced, and exchange between data frames may be left in a short transmission delay time (SIFS), thus increasing network efficiency.

The HC controls transmission delay and scheduling by defining, in a parameter, a QoS characteristic for a particular traffic required by an application service to support QoS. Prior to the transmission of the parameterized QoS traffic, the HC establishes a virtual connection that is referred to as a traffic stream. The traffic stream may correspond to each of uplink from STA to AP, downlink from AP to STA, or direct link from STA to STA. In order to configure a traffic stream between an AP and an STA, QoS demand parameters such as delay time and traffic characteristics such as frame size and average transmission speed are exchanged through a mutual negotiation process.

In case the HC transmits a QoS CF-Poll frame to an STA, a TXOP limit value that is a service provision time allowed to the STA is included in the QoS control field. In other words, the HC controls allocation of a medium access time using the TXOP. The TXOP constraint value is determined by a TSPEC. The TSPEC is requested by a station, and an AP determines whether to accept or decline the request for the TSPEC depending on network circumstances.

Once a traffic stream is configured, the HC provides contracted QoS by allocating a radio band required for the configured traffic stream between the AP and the STA. At a non-contention period of the HCCA, the HC has a right to control the medium, and if required, even at a contention period, the HC obtains a right to control the medium by transmitting a QoS CF-Poll frame after as long a delay time as the PIFS.

Figure 13:
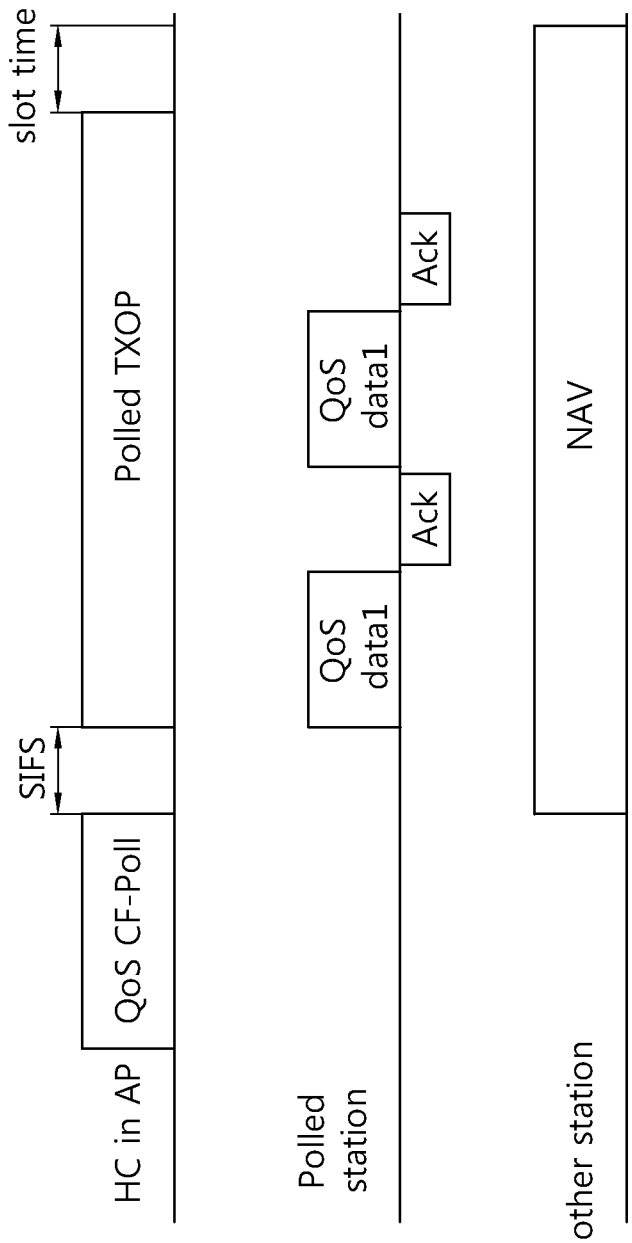
FIG. 13 is a conceptual diagram illustrating a Polled TXOP timing.

FIG. 13 is a conceptual diagram illustrating a Polled TXOP timing.

Referring to FIG. 13, a polled STA that possesses TXOP transmits several frames with an authority of channel access during the time as much as the TXOP limitation value designated to the QoS CF-Poll frame by receiving the QoS CF-Poll frame. In this time, other STAs also setup their network allocation vector (NAV) by summing the TXOP time and a predefined time after receiving the QoS CF-Poll frame even though it does not correspond to them, and do not contend to channel access during the time.

Therefore, a HC is required to schedule a proper transmission of the QoS CF-Poll frame in order to satisfy contracted QoS requirements. Since conditions of channel of wireless medium are various depending on time or location are various, it is very important factor for supporting QoS to make an effective scheduling algorithm. Good scheduling algorithm may improve a performance of wireless network by permitting more traffic streams without breaching QoS contract.

After receiving the beacon frame or the probe response frame, a plurality of STAs may try to access an AP simultaneously. In this case, a plurality of STAs performs the channel access, and thus, a probability of collision may be increased. In the conventional initial access procedure of STA, the STA uses an access parameter (e.g., CWmin, CWmax and AIFSN) that corresponds to AC_VO when transmitting an association request frame, and transmits it. In this case, a probability that a plurality of STAs simultaneously perform access to the AP is increased, and thus, an initial access procedure may be delayed.

In the embodiments of the present invention, a method is introduced to distribute transmission timing of an association request frame when transmitting the association request frame of a plurality of user equipment to an AP. Hereinafter, the embodiments of the present invention are described based on the association request frame for the convenience of description, but also applicable to other management frame (e.g., an authentication request frame) and such an embodiment also falls into the scope of the present invention.

Figure 14:
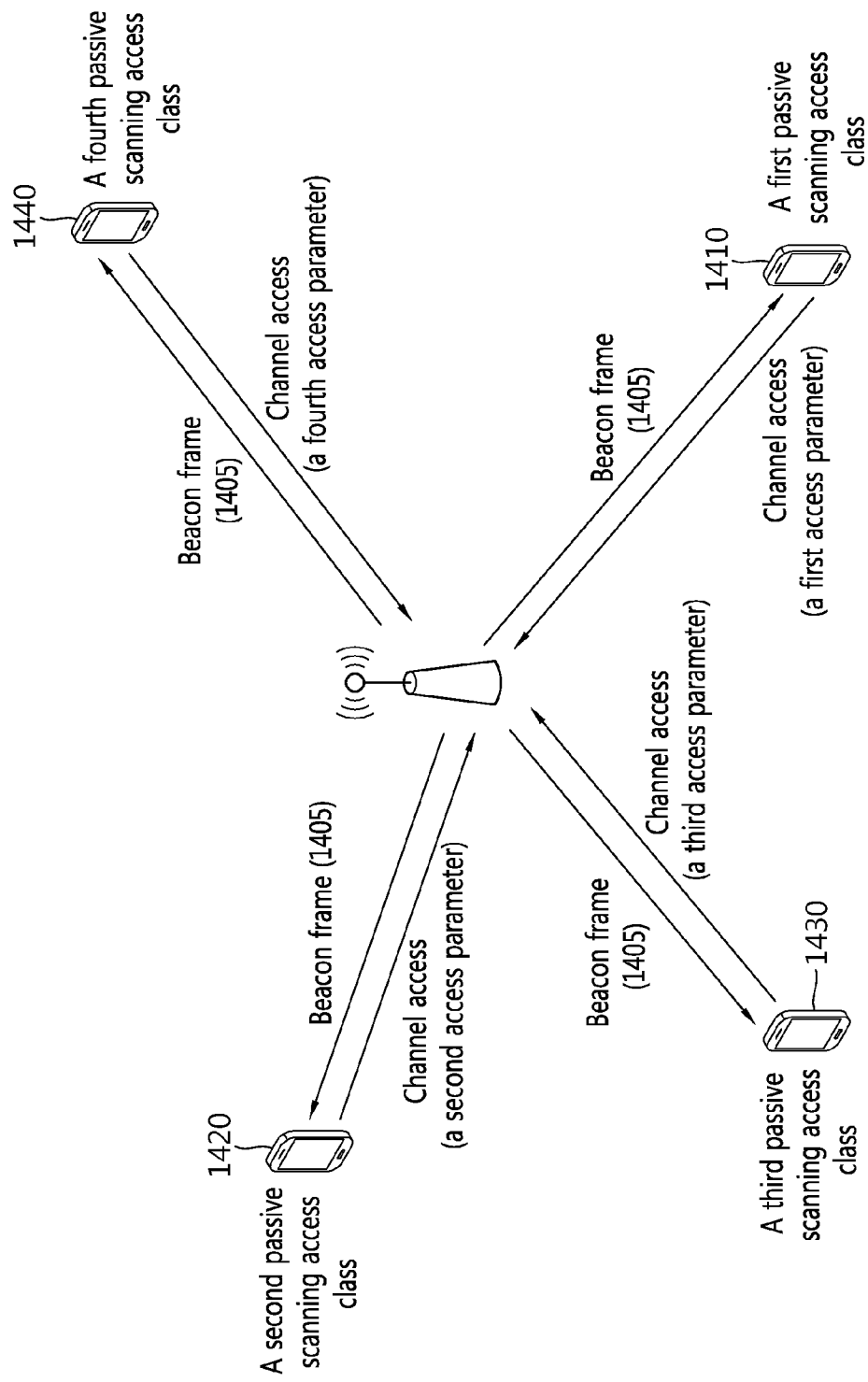
FIG. 14 is a conceptual diagram illustrating a method of the channel access according to an embodiment of the present invention.

FIG. 14 is a conceptual diagram illustrating a method of the channel access according to an embodiment of the present invention.

Referring to FIG. 14, an AP 1400 may determine of channel state information (e.g., a congestion status of wireless link). The AP 1400 may use various methods to determine the channel state information. For example, the AP 1400 may determine based on a frame received from neighboring STA, or may request information of the channel state to the STA and based on this, acquire the information on whether the wireless link is congested. In addition, the AP may acquire information of the channel state from other APs.

As a result of determining the channel state information of the AP 1400, in case that the congestion state of the wireless link exceeds a threshold value, the AP 1400 may allocate the access parameters (e.g., IFS, CWmin, CWmax, and TXOP) to STAs 1410, 1420 1430 and 1440 for each passive scanning access class through a beacon frame 1405. In addition, the AP 1400 may transmit information of wireless link congestion state to the STAs 1410, 1420 1430 and 1440 through the beacon frame 1405. For example, the AP 1400 may calculate the wireless link congestion state based on information of number of STAs which are currently associated, and in case that the number of STAs currently associated exceeds a predetermined threshold value, the AP may determine the channel to be congested.

The information of wireless link congestion state may be indicated by, for example, 0 and 1. If the wireless link congestion state is 0, it may indicate that the wireless link congestion is lower than the threshold value, and if he wireless link congestion state is 1, it may indicate that the wireless link congestion exceeds the threshold value. If the wireless link congestion information included in the received beacon frame 1405 is 1, the STAs 1410, 1420 1430 and 1440 may transmit a management frame (e.g., the association request frame) to the AP 1400 based on information of access parameter according to the passive scanning access class included in the beacon frame 1405.

If the wireless link congestion information included in the received beacon frame 1405 is 0, the STAs may apply the AC_VO which is an access class of the association request frame defined in the conventional QoS management frame (QMF) policy, and by using an access parameter calculated based on this, transmit the association request frame to the AP.

The passive scanning access class may be setup by a plurality of classes. The STAs 1410, 1420 1430 and 1440 may use the access parameters setup for each of the passive scanning access classes to transmit the association request frame. Hereinafter, in the embodiments of the present invention, as an example, four passive scanning access classes are defined, and based on the access classes according to each of the passive scanning access classes, a method for transmitting a management frame (e.g., the association request frame) by the STAs 1410, 1420 1430 and 1440 will be described.

Four passive scanning access classes may defined as a first passive access class, a second passive access class, a third passive access class and a fourth passive access class. In each of the passive scanning access classes, an access parameter set in which at least one access parameter is different may be setup. Hereinafter, in the embodiments of the present invention, a case that all of the access parameters are different according to the passive scanning access classes will be assumed and described for the convenience of description.

As the passive access class has high value, the passive access class and the access parameter may be configured such that the STA performs faster channel access. For example, the higher the passive access class, the smaller IFS and/or CWmin value(s) may be allocated. By using such a method, if the passive access class has higher value, the STA searches small IFS interval and access channel by setup small back off-time, and therefore, a priority of the channel access may be increased. In addition, the higher the passive access class, the greater TXOP value may be allocated. By allocating great TXOP value, the channel access priority may be increased preferentially such that the passive access class has high value. That is, a time or a priority required for the STA to be associated may be different according to the passive access class. In case of performing the channel access by using such a method, the channel access is distributed, and accordingly, a phenomenon of occurring collision may be prevented when performing an initial access to the AP of the STA.

As shown in FIG. 14, each of the STAs 1410, 1420, 1430 and 1440 that receive the same beacon frame 1405 from the AP 1400 may setup a respective passive access class. For example, the access class may be determined such as the first STA 1410 determines a first passive scanning access class, the second STA 1420 determines a second passive scanning access class, the third STA 1430 determines a third passive scanning access class, and the fourth STA 1410 determines a fourth passive scanning access class. In such a case, each of the STAs may perform the channel access based on the respective access parameter according to the determined passive scanning access class, respectively. For example, the first STA 1410 may perform the channel access based on a first access parameter according to the first passive scanning access class, the second STA 1420 may perform the channel access based on a second access parameter according to the second passive scanning access class, the third STA 1430 may perform the channel access based on a third access parameter according to the third passive scanning access class, and the fourth STA 1440 may perform the channel access based on a fourth access parameter according to the fourth passive scanning access class. By using such a method, when a plurality of STAs 1410, 1420, 1430 and 1440 that simultaneously receive the beacon frame 1405 performs the channel access, a transmission timing of the management frame (e.g., the association request frame) that transmits it may be distributed.

Figure 15:
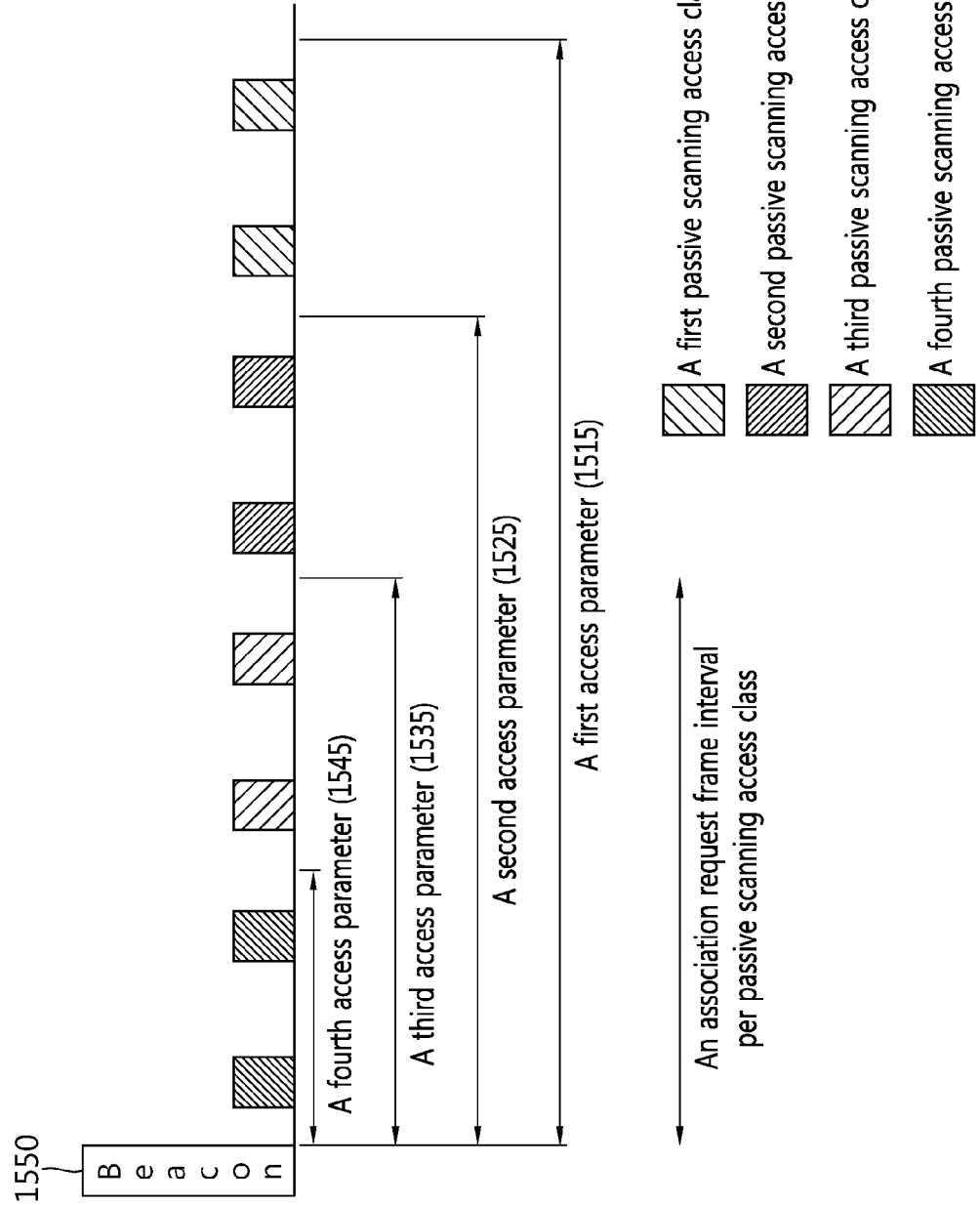
FIG. 15 is a conceptual diagram illustrating the channel access of an STA according to a passive scanning access class according to an embodiment of the present invention.

FIG. 15 is a conceptual diagram illustrating the channel access of an STA according to a passive scanning access class according to an embodiment of the present invention.

Referring to FIG. 15, an STA 1540 corresponding to a fourth passive scanning class may firstly access a channel based on a fourth access parameter 1545, and next, an STA 1530 corresponding to a third passive scanning class may access the channel based on a third access parameter 1535. Next, an STA 1520 corresponding to a second passive scanning class may access the channel based on a second access parameter 1525, and an STA 1510 corresponding to a first passive scanning class may access the channel based on a first access parameter 1515. That is, by dispersing the channel access timing according to the passive scanning access class, many STAs may be controlled not to simultaneously access an AP.

Subsequently, the embodiment of the present invention illustrates a method for determining a passive scanning access class by an STA.

If wireless link congestion state information of the received beacon frame is 1, an STA may transmit an association request frame to an AP by selecting one passive scanning access class. In order for the STA to select one passive scanning access class, for example, a method below may be used.

The STA may select a random variable in a range of 0 to 1. The STA may select a passive scanning access class according to the selected random variable. Table 3 below represents the passive scanning access classes according to the range of random variable.

TABLE 3

| Random variable | Passive scanning access class |
|---|---|
| 0 ≤ random variable < 0.25 | A first passive scanning access class |
| 0.25 ≤ random variable < 0.5 | A second passive scanning access class |
| 0.5 ≤ random variable < 0.75 | A third passive scanning access class |
| 0.75 ≤ random variable < 1 | A fourth passive scanning access class |

The STA may randomly select a number between 0 and 1, and may determine the passive scanning class according to the selected random variable. The STA may transmit the association request frame to the AP based on the determined passive scanning class. According to the random variable that a plurality of STAs randomly select, the passive scanning class may be selected with being distributed by the first passive scanning class to the fourth passive scanning class. By transmitting the association request frame to the AP according to the distributed passive scanning access class, a user equipment may distribute a channel access timing to transmit the association request frame.

Table 4 below represents access parameters according to the passive scanning class.

TABLE 4

| Passive scanning access class | CWmin | CWmax | IFS (e.g., AIFS) |
|---|---|---|---|
| A first passive scanning access class | (default CWmin of AC_VO)*8 | (default CWmax of AC_VO)*8 | (default AIFs of AC_VO)*8 |
| A second passive scanning access class | (default CWmin of AC_VO)*4 | (default CWmax of AC_VO)*4 | (default AIFs of AC_VO)*4 |
| A third passive scanning access class | (default CWmin of AC_VO)*2 | (default CWmax of AC_VO)*2 | (default AIFs of AC_VO)*2 |
| A fourth passive scanning access class | (default CWmin of AC_VO) | (default CWmax of AC_VO) | (default AIFs of AC_VO) |

Referring to Table 4, an access parameter (e.g., CWmin, CWmax and IFS) according to the passive scanning access class may be defined. In case of AC_VO in the existing EDCA, an access parameter of each of the passive scanning access classes may be determined with an access parameter value as a reference value. The values of CWmin, CWmax and IFS may be decreased as going from the first passive scanning access class to the fourth passive scanning access class. By the access parameter configuration according to the passive scanning access class, the STA corresponding to high passive scanning access class value may quickly access the channel than the STA corresponding to lower passive scanning access class.

The access parameters shown in Table 4 are exemplary access parameters. In order to perform channel access of different STAs according to the passive scanning access class, different access parameters may be defined, and such an embodiment also falls into the scope of the present invention.

Table 5 below is another example illustrating the access parameters according to the passive scanning class.

TABLE 5

| Passive scanning access class | CWmin | CWmax | IFS (e.g., AIFS) |
|---|---|---|---|
| A first passive scanning access class | CWmin of AC_BK | CWmax of AC_BK | AIFS of AC_BK |
| A second passive scanning access class | CWmin of AC_BE | CWmax of AC_BE | AIFS of AC_BE |
| A third passive scanning access class | CWmin of AC_VI | CWmax of AC_VI | AIFS of AC_VI |
| A fourth passive scanning access class | CWmin of AC_VO | CWmax of AC_VO | AIFS of AC_VO |

The access parameters according to the passive scanning access class may be setup as above based on the conventional EDCA parameter. The access parameter information according to AC_BK, AC_BE, AC_VI and AC_VO is described in section 8.4.2.31 EDCA parameter set element of IEEE Draft P802.11-REVmb™/D12, November 2011 (IEEE Standard for Information Technology—Telecommunications and information exchange between systems—Local and metropolitan area networks—Specific requirements Part 11: Wireless LAN Medium Access Control (MAC) and Physical Layer (PHY) Specifications) introduced on November 2011.

Table 6 below represents the access parameters according to AC_BK, AC_BE, AC_VI and AC_VO as an example, in case that dot11OCBActivated defined in the conventional IEEE Draft P802.11-REVmb™/D12 has a true value. According to AC_BK, AC_BE, AC_VI and AC_VO, the access parameters such as CWmin, CWmax, AIFSN and TXOP may be differently defined.

TABLE 6

| AC | CWmin | CWmax | AIFSN | TXOP Limit OFDM/CCK-OFDM PHY |
|---|---|---|---|---|
| AC_BK | aCWmin | aCWmax | 9 | 0 |
| AC_BE | aCWmin | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Referring to Table 6, in the embodiments of the present invention, the access parameters according to the passive scanning class may be determined based on the access parameters of AC_BK, AC_BE, AC_VI and AC_VO that have been used in the conventional EDCA.

Hereinafter, a method of applying a scaling element of the passive scanning parameter will be described.

An AP may change the access parameters according to the wireless link congestion state information included in the beacon frame, the FILS discovery frame or the probe response frame. For example, the access parameters may be changed by transmitting an additional scaling element (e.g., N) to an STA. The STA may change the access parameters configured based on the received scaling element, and perform the channel access based on the changed access parameters.

For example, as shown in Table 4 described above, the STA may define default access parameters (default CWmin, default CWmax and default IFS) and determine the access parameter values that the STA is going to use based on the scaling element transmitted from the AP. If the scaling element has N value, the access parameters that the STA is going to use may be determined as {(CWmin*N), (CWmax*N) and (AIFS*N)}. The STA may transmit the association request frame based on the determined access parameters.

For example, as shown in Table 7 below, the access parameters defined in each passive scanning access class of Table 4 may be defined as a default, and scaling may be performed by multiplying N to each of the access parameters.

TABLE 7

| Passive scanning access class | CWmin | CWmax | IFS (e.g., AIFS) |
|---|---|---|---|
| A first passive scanning access class | (default CWmin of AC_VO)*8*N | (default CWmax of AC_VO)*8*N | (default AIFs of AC_VO)*8*N |
| A second passive scanning access class | (default CWmin of AC_VO)*4*N | (default CWmax of AC_VO)*4*N | (default AIFs of AC_VO)*4*N |
| A third passive scanning access class | (default CWmin of AC_VO)*2*N | (default CWmax of AC_VO)*2*N | (default AIFs of AC_VO)*2*N |
| A fourth passive scanning access class | (default CWmin of AC_VO) *N | (default CWmax of AC_VO) *N | (default AIFs of AC_VO) *N |

By using such a method, the access parameters of STA may be more adaptively configured according to the channel state. In the above described embodiments, it is described that the STA determines the access parameters based on the passive scanning access class for the convenience of description, but the STA may determine the random variable and determine the access parameters according to the random variable right away. For example, in case that information on channel state of the received beacon frame or the FILS discovery frame indicates congestion, the STA may select the random variable. The STA may select one access parameter set among a plurality of access parameter set based on the selected random variable. The STA may transmit the association request frame to the AP by performing an initial channel access based on the selected access parameter.

As another example, the passive scanning access class may not be separately defined in a user equipment, but the access parameter may be configured as a value of multiplying N to the default access parameter. That is, the user equipment may not the passive scanning access class, but change the N value of the frame transmitted from an AP and transmit it to the STA. By using such a method, the N value may be changed depending on the STA that receives the beacon frame, on the STA that receives the probe response frame and on the STA that receives the FILS discovery frame, and the channel access may be performed based on different access parameters. The STA may perform the channel access by determining (default CWmin, default CWmax and default IFS) based on the received N value.

As another method of applying a scaling element of the passive scanning parameter, a method below may be used.

According to the embodiments of the present invention, a user equipment may adaptively select the passive scanning access class according to the wireless link congestion. In the above described channel access method of STA, the AP performs an initial access procedure according to the passive scanning access class only in case that the wireless link is congested (e.g., the wireless link congestion is 0) based on the wireless link congestion information. Furthermore, even in case that the wireless link congestion information transmitted by the AP is indicated as being not congested (e.g., the wireless link congestion is 1), the AP may perform an initial access procedure according to the passive scanning access class.

In the embodiments of the present invention, by differently configuring the passive scanning access class according to a random variable interval that the STA selects depending on the wireless link congestion, the STA may select the passive scanning access class with different ratio depending on the wireless link congestion.

For example, in case that the wireless link congestion of the beacon frame received by the STA indicates that the wireless link is not congested, it may be configured that relatively more STAs are to select high passive scanning access class (e.g., the third passive scanning access class or the fourth passive scanning access class). For example, in order for relatively more STAs to select high passive scanning access class, a range of random variable may be extended such that the third passive scanning access class or the fourth passive scanning access class may be selected. Table 8 below distinguishes the passive scanning access classes according to the random variable.

TABLE 8

| Random variable | Passive scanning access class |
|---|---|
| 0 ≤ random variable < 0.15 | A first passive scanning access class |
| 0.15 ≤ random variable < 0.3 | A second passive scanning access class |
| 0.3 ≤ random variable < 0.5 | A third passive scanning access class |
| 0.5 ≤ random variable < 1 | A fourth passive scanning access class |

Referring to Table 8, the range of random variable selected by the third passive scanning access class or the fourth passive scanning access class may be extended such that more of the third passive scanning access class or the fourth passive scanning access class is selected according to the random variable that the STA selects. The random variable section according to the passive scanning class shown in Table 8 is an arbitrarily defined section in order for the STA to be determined as high passive scanning class with relatively higher probability according to the random variable that the STA selects. The configured random variable section in Table 8 may be changed.

In addition, in case that the wireless link congestion indicates that the wireless link is not congested in the received beacon frame, it may be configured that relatively more STAs are to select low passive scanning access class (e.g., the first passive scanning access class or the second passive scanning access class). For example, in order for relatively more STAs to select low passive scanning access class, a range of random variable may be extended such that the first passive scanning access class or the second passive scanning access class may be selected. Table 9 below distinguishes the passive scanning access classes according to the random variable.

TABLE 9

| Random variable | Passive scanning access class |
| --- | --- |
| 0 ≤ random variable < 0.5 | A first passive scanning access class |
| 0.5 ≤ random variable < 0.7 | A second passive scanning access class |
| 0.7 ≤ random variable < 0.85 | A third passive scanning access class |
| 0.85 ≤ random variable < 1 | A fourth passive scanning access class |

Referring to Table 9, the range of random variable selected by the first passive scanning access class or the second passive scanning access class may be extended such that more of the first passive scanning access class or the second passive scanning access class is selected according to the random variable that the STA selects. The random variable section according to the passive scanning class shown in Table 9 is an arbitrarily defined section in order for the STA to be determined as low passive scanning class with relatively higher probability according to the random variable that the STA selects. The configured random variable section in Table 9 may be changed.

Figure 16:
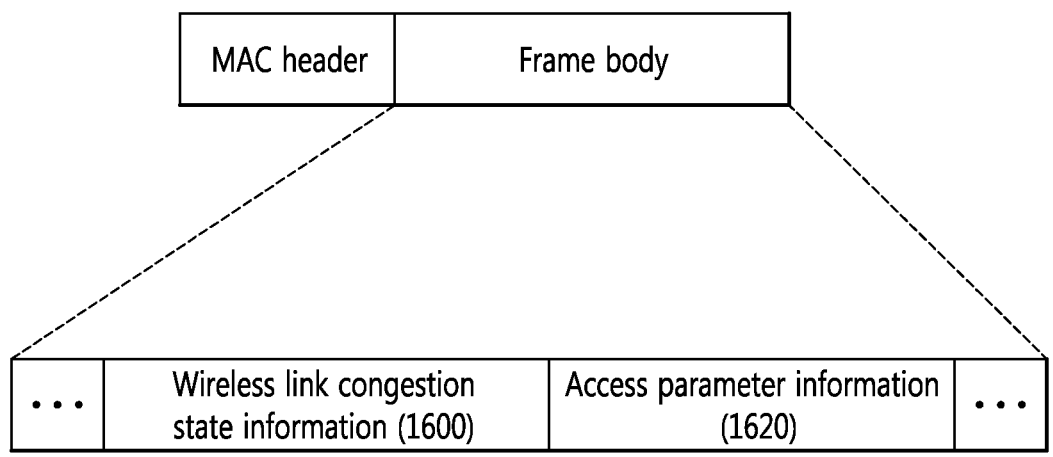
FIG. 16 is a conceptual diagram illustrating a frame format according to an embodiment of the present invention.

FIG. 16 is a conceptual diagram illustrating a frame format according to an embodiment of the present invention.

In FIG. 16, an AP may transmit a beacon frame, an FILS discovery frame and a probe response frame with information of link congestion state being included.

Wireless link congestion state information 1600 may include information of channel state of the current AP. For example, in case that a channel is congested as a result of the determination of channel state by the AP, the AP may transmit the wireless link congestion state information 1600 with being configured to 0 to an STA. On the contrary, in case that the channel is not congested as a result of the determination of channel state by the AP, the AP may transmit the wireless link congestion state information 1600 with being configured to 1 to an STA. Whether the channel is congested or not may be determined, for example, based on a frame received from a neighboring STA or by requesting information of the channel state to the STA and based on this, by obtaining the wireless link congestion state information 1600. In addition, the AP may acquire information of the channel state from other AP.

Additionally, the AP may transmit access parameter information 1620 according to a wireless link access class to the beacon frame, the FILS discovery frame or the probe response frame. The STA may determine the passive scanning access class, and perform an initial channel access based on the access parameter determined according to the access parameter information 1620 depending on the passive scanning access class.

The access parameter information depending on the passive scanning access class may not be transmitted through the beacon frame, the FILS discovery frame or the probe response frame, and may be predefined to the AP and/or the STA. In such a case, in the beacon frame, the FILS discovery frame or the probe response frame, access parameter information depending on the passive scanning access class may not be included.

In addition, an access parameter scaling element depending on the passive scanning access class may be additionally included in the beacon frame, the FILS discovery frame or the probe response frame of the AP.

Figure 17:
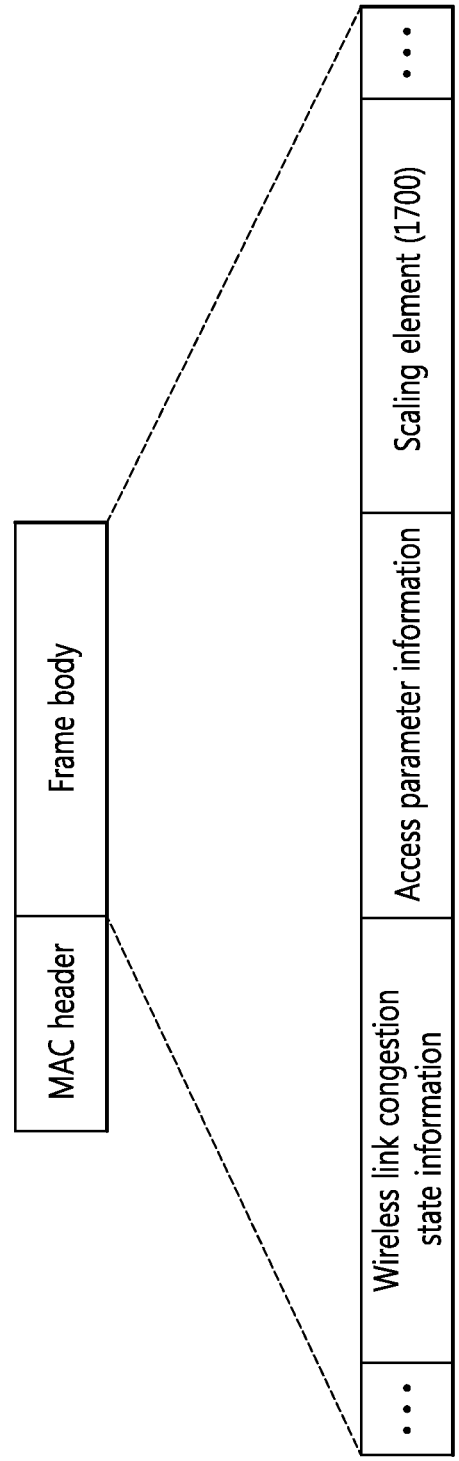
FIG. 17 is a conceptual diagram illustrating a frame format according to an embodiment of the present invention.

FIG. 17 is a conceptual diagram illustrating a frame format according to an embodiment of the present invention.

Referring to FIG. 17, the beacon frame, the FILS discovery frame or the probe response frame may be transmitted with a scaling element 1700 being included.

An STA may define default access parameters (default CWmin, default CWmax and default IFS), and determine an access parameter value that the STA is going to use based on the scaling element 1700 that an AP transmitted. As described above, the access parameters may be determined by multiplying N which is a scaling element to the default parameters.

According to the embodiments of the present invention, an STA or an AP may transmit information on whether a distributed channel access is supported based on different access parameters in the STA or the AP. Hereinafter, in the embodiments of the present invention, the operation of performing channel access on different timings based on different access parameters is expressed by a term, a distributed channel access.

Figure 18:
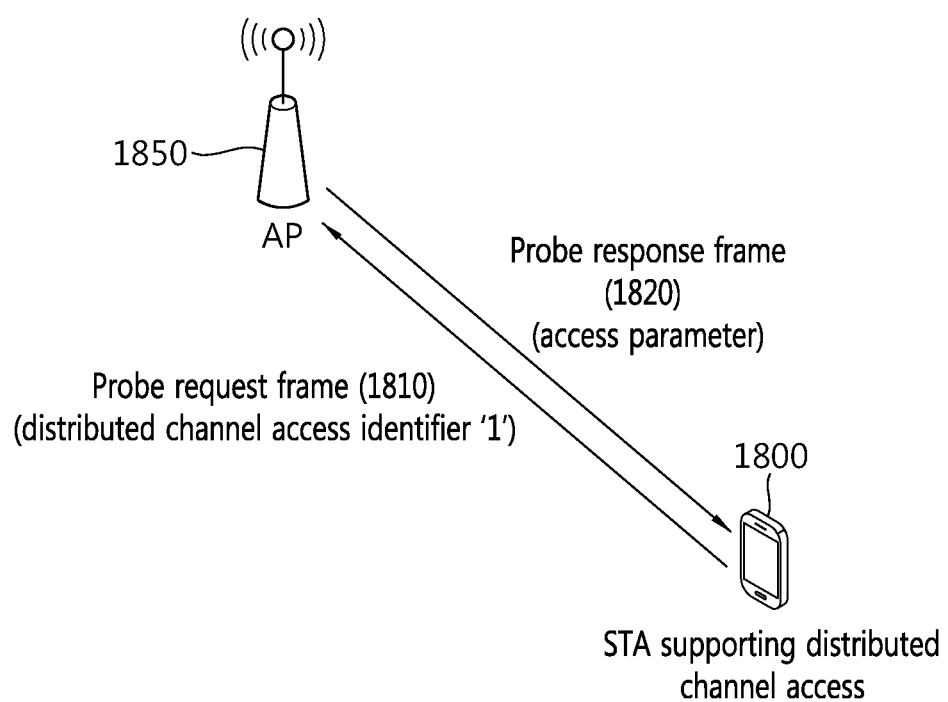
FIG. 18 is a conceptual diagram illustrating an initial channel access operation of an STA according to an embodiment of the present invention.

FIG. 18 is a conceptual diagram illustrating an initial channel access operation of an STA according to an embodiment of the present invention.

Referring to FIG. 18, an STA 1800 may transmit a probe request frame 1810 with information indicating that the STA 1800 is an STA 1800 that support the distributed channel access being included to an AP 1850. The meaning of supporting the distributed channel access may signify that the channel access may be performed by selectively determining an access parameter when performing the channel access, and through the determined access parameter. For example, it may be information indicating that the AP 1850 may perform the channel access based on the access parameter information transmitted through a beacon frame or a probe response frame 1820. For example, in case that the STA 1800 does not support the distributed channel access, the STA may transmit a distributed channel access indicator included in the probe request frame 1810 with being configured to 0. On the contrary, in case that the STA 1800 supports the distributed channel access, the STA may transmit the distributed channel access indicator included in the probe request frame 1810 with being configured to 1.

The AP 1850 may determine whether the distributed channel access is supported by the STA 180 based on the distributed channel access indicator included in the probe request frame 1810. If the STA is indicated to support the distributed channel access in the probe request frame 1810 received from the STA 1800, the AP 1850 may transmit the probe response frame 1820 with information of an access parameter that the STA 1800 is going to use being included.

If the STA is not indicated to support the distributed channel access in the probe request frame 1810 received from the STA 1800, the AP 1850 may transmit the probe response frame 1820 without information of an access parameter that the STA 1800 is going to use being included.

For example, in case that the STA 1800 is indicated to support the distributed channel access by the distributed channel access indicator in the probe request frame 1810 that the STA 1800 transmits, the AP 1850 may transmit the probe response frame 1820 with the access parameter information (AIFSN, CWmin/CWmax and TXOP limit) that the STA 1800 is going to use being included. The STA 1800 may transmit an association request frame by performing the channel access based on the access parameter information received through the probe response frame 1820 to the AP.

Figure 19:
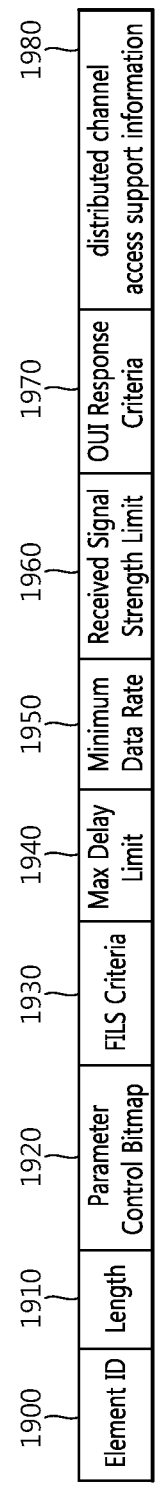
FIG. 19 is a conceptual diagram illustrating a probe request frame according to an embodiment of the present invention.

FIG. 19 is a conceptual diagram illustrating a probe request frame according to an embodiment of the present invention.

In FIG. 19, a method of including distributed channel access support information in an FILS request parameter which is included in a probe request frame is introduced. The method of including the distributed channel access support information in the FILS request parameter is one example of a method of including the distributed channel access support information in the probe request frame. The distributed channel access support information may be included in the probe request frame by various methods.

An STA may include an element ID 1900, a length 1910, a parameter control bitmap 1920, FILS criteria 1930, a max delay limit 1940, a minimum data rate 1950, a received signal strength limit 1960, organizationally unique identifier (OUI) response criteria 1970 and distributed channel access support information 1980, as the FILS request parameters.

The element ID 1900 may include identifier information for indicating an FILS request parameter element.

The length 1910 may include information on length of the FILS request parameter element.

The parameter control bitmap 1920 may include bitmap information of whether the FILS criteria, the maximum delay limit, the minimum data rate, the received signal strength limit, the OUI response criteria and whether the distributed channel access support information included in the FILS request parameter element are existed.

The FILS criteria 1930 may include information that instruct to request information of different BSS, information on BSS delay criteria, information on whether it is a user equipment that supports high throughput (HT) or very high throughput (VHT), etc.

The maximum delay limit 1940 may include information of a value of the maximum access delay for delay criteria indicated by the BSS delay criteria field.

The minimum data rate 1950 may include information of a lowest total data rate for transmitting MSDU.

The received signal strength limit 1960 may include information of signal strength criteria for transmitting a response to the probe request frame by an AP that receives the probe request frame.

The OUI response criteria 1970 may include information on whether a vendor specific element is existed.

The distributed channel access support information 1980, as described above, may include information on whether the STA supports the distributed channel access. For example, in case that the distributed channel access support information is 0, it may indicate that the distributed channel access is not supported. In case that the distributed channel access support information is configured to 1, the AP may determine an access parameter for distributed association, and transmit it to the STA through the probe response frame. The distributed channel access support information 1980 may also be configured regardless of whether it is supported by the STA. For example, even in case that the STA supports the distributed channel access, if it is determined not to perform the distributed channel access by a selection of the STA, the distributed channel access support information may be transmitted with being configured not to perform the distributed channel access.

Table 10 below represents the distributed channel access support information.

TABLE 10

| Value | Explanation |
|---|---|
| 0 | Distributed channel access is not supported. |
| 1 | Distributed channel access is supported. |

Referring to Table 10, in case that the STA is an STA that supports the distributed channel access or the STA determines to perform the distributed channel access, the STA may transmit the distributed channel access support information with being configured to 1 to the AP. On the contrary, in case that the STA is an STA that does not support the distributed channel access or the STA determines not to perform the distributed channel access, the STA may transmit the distributed channel access support information with being configured to 0 to the AP.

Figure 20:
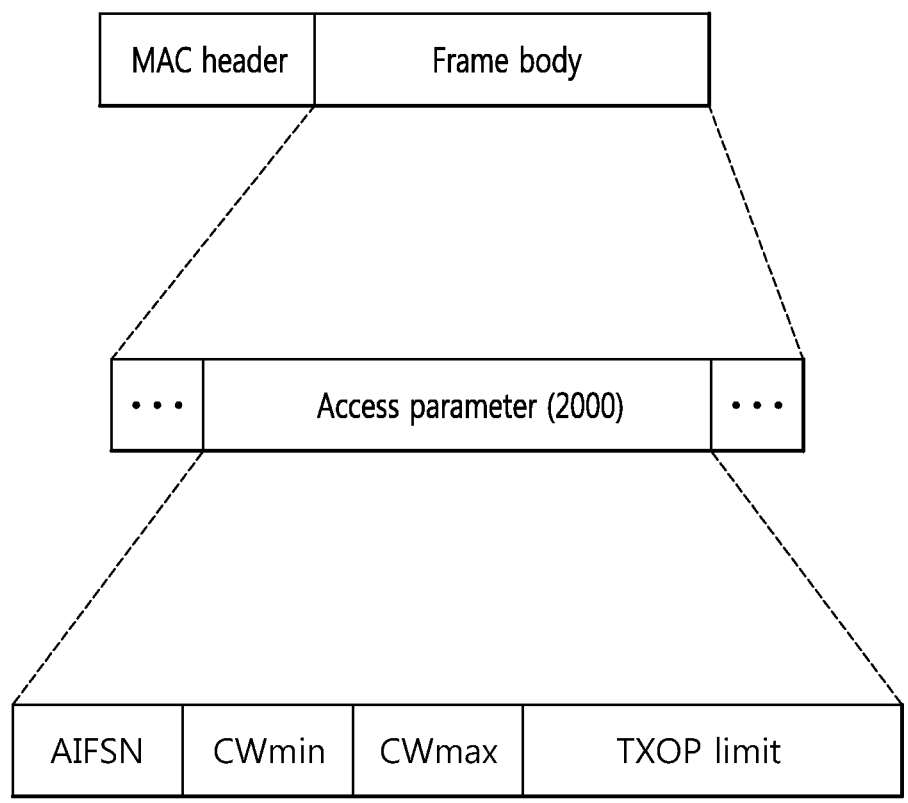
FIG. 20 is a conceptual diagram illustrating a probe response frame according to an embodiment of the present invention.

FIG. 20 is a conceptual diagram illustrating a probe response frame according to an embodiment of the present invention.

Referring to FIG. 20, a probe response frame may include access parameters 2000 that are to be used when performing the channel access for transmitting an association request frame by an STA.

In case that the distributed channel access support information included in a probe request frame that the STA transmits is transmitted with being configured to support the distributed channel access, an AP may transmit a probe response frame with the access parameters 2000 being included.

As examples of the access parameters 2000 that are to be used when performing the channel access included in the probe response frame, AIFSN, CWmax, CWmin and TXOP limit may be included.

The STA may receive the AIFSN, CWmax, CWmin and TXOP limit, which are the access parameters 2000, through the probe response frame, and transmit an association request frame by performing the channel access based on the received access parameters 2000.

Also, according to the embodiments of the present invention, an AP may transmit information on whether the distributed channel access is supported to an STA, on the other hand.

For example, the AP may transmit the information on whether the AP supports the distributed channel access to the STA by transmitting a management frame such as a beacon frame or an FILS discovery frame. In the beacon frame or the FILS discovery frame, the information on whether the distributed channel access is supported which is included in the probe request frame described above in FIG. 18. For example, in case of supporting the distributed channel access, the AP may transmit the distributed channel access support information with being configured to 1. In case that the distributed channel access support information is configured to 1, the information of access parameter according to the passive scanning access class may be additionally included in the beacon frame or the FILS discovery frame and transmitted. For example, the AP may transmit the information of access parameter (e.g., AIFSN, CWmax, CWmin, TXOP, etc) according to the distributed channel access support information and the passive scanning access class with being included to the STA. In case that the received distributed channel access support information is 1, the STA may perform the channel access for transmitting the association request frame based on the information of access parameter according to the passive scanning access class included in the beacon frame. As another example, the information of access parameter according to the passive scanning access class may be predetermined, and in such a case, the access parameter according to the passive scanning access parameter may not separately be transmitted.

For example, in case that the passive scanning access class is defined by four classes, there may be the information of access parameters that correspond to a first passive scanning access class, a second passive scanning access class, a third passive scanning access class and a fourth passive scanning access class, respectively. The STA may determine the access parameter according to the determined passive scanning access class, and based on this, may perform the channel access. As described above, the STA may select a random variable to determine the passive scanning access class, and determine the passive scanning access class according to the selected random variable.

For example, as shown in Table 11 below, the passive scanning access class according to the random variable section as below may be determined.

TABLE 11

| Random variable | Passive scanning access class |
| --- | --- |
| 0 ≤ random variable < 0.25 | A first passive scanning access class |
| 0.25 ≤ random variable < 0.5 | A second passive scanning access class |
| 0.5 ≤ random variable < 0.75 | A third passive scanning access class |
| 0.75 ≤ random variable < 1 | A fourth passive scanning access class |

The passive scanning access class corresponding to the random variable section disclosed in table 11 has arbitrary correspondence relation, and the random variable section that determines the passive scanning access class may be determined as other arbitrary value.

The STA may determine the passive scanning access class according to the random variable as such, and may determine the access parameter according to the determined passive scanning access class. In order to determine the access parameter according to the passive scanning access class, various methods may be used. For example, the access parameter according to the passive scanning access class may be determined using various methods such as a method of differently configuring the access parameter by multiplying an arbitrary value based on the default access parameters (default CWmin, default CWmax and default AIFS) as shown in Table 5 or Table 7 described above, a method of calculating the access parameter based on the access parameter defined in AC_BE, AC_BK, AC_VI and AC_VO which are access categories used in the conventional EDCA, and so on.

Figure 21:
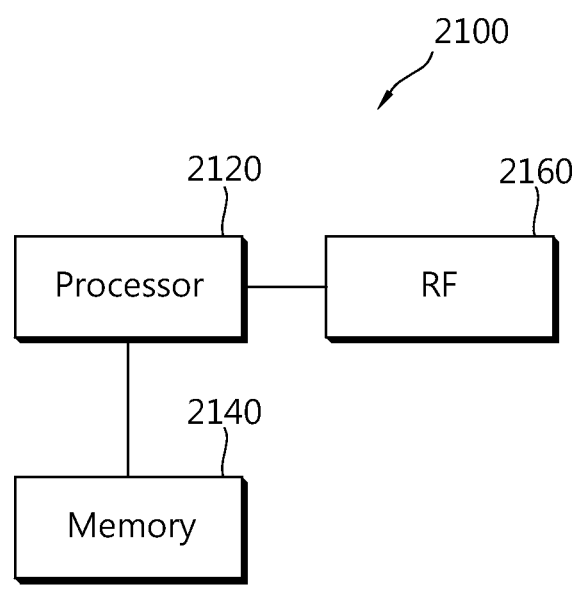
FIG. 21 is a block diagram illustrating the wireless apparatus in which an embodiment of the present invention can be implemented.

FIG. 21 is a block diagram illustrating the wireless apparatus in which an embodiment of the present invention can be implemented.

Referring to FIG. 21, the wireless apparatus 2100 is an STA that may implement the embodiments described above, and may also be an AP or non-AP station.

The wireless apparatus 2100 includes a processor 2120, a memory 2140 and a radio frequency (RF) unit 2160.

The RF unit 2160 may be connected to the processor 2120 and transmits/receives the radio signal.

The processor 2120 implements the proposed functions, processes and/or methods. For example, the processor 2120 may be configured to perform the operation of the wireless apparatus according to the embodiments of the present invention described above.

For example, in case that the wireless apparatus is an AP, the processor 2120 may be implemented to determine the wireless state congestion information and the access parameter set which are going to be included in the beacon frame.

In addition, in case that the wireless apparatus is an STA, the processor 2120 may be implemented to receive the information on channel state and the frame that includes a plurality of access parameter sets, and in case that the information on channel state indicates that the wireless link is congested, the processor may be implemented to select the random variable. Additionally, the processor 2120 may be implemented to select one access parameter set among the N access parameter sets based on the random variable, and transmit the association request frame to the AP by performing the initial channel access based on the one access parameter set.

The processor 2120 may include Application-Specific Integrated Circuits (ASICs), other chipsets, logic circuits, data processors and/or convertors that reciprocally convert baseband signals and radio signals. The memory 2140 may include Read-Only Memory (ROM), Random Access Memory (RAM), flash memory, memory cards, storage media and/or other storage devices. The RF unit 2160 may include one or more antennas to transmit and/or receive the radio signal.

When the embodiment is implemented in software, the aforementioned scheme may be implemented as a module (process or function) that performs the aforementioned function. The module may be stored in the memory 2140 and executed by the processor 2120. The memory 2140 may be placed inside or outside the processor 2120 and may be connected to the processor 2120 using a variety of well-known means.

What is claimed is:

1. A method for an initial channel access performed by a station (STA) in a wireless LAN, comprising:
   receiving, by the STA, a frame including information on a channel state and N (N>1) access parameter sets from an access point (AP);
   selecting, by the STA, a random variable when the information on the channel state indicates that a wireless link is congested;
   selecting, by the STA, one access parameter set among the N access parameter sets based on the random variable; and
   transmitting an association request frame to the AP by performing the initial channel access based on the one access parameter set,
   wherein each of the N access parameter sets includes information on a contention window minimum (CWmin), a contention window maximum (CWmax) and an arbitration inter-frame space (AIFS) to perform the initial channel access by the STA.

2. The method of claim 1,
   wherein the each of the N access parameter sets corresponds to each of N random variable ranges, wherein the random variable is included in one random variable range among the N random variables ranges, and wherein the selected access parameter set corresponds to the one random variable range.

3. The method of claim 2,
wherein a size of each of the N random variable range is differently determined according to the information on the channel state.

4. The method of claim 2,
wherein the access parameter set is determined as a first access parameter set when the random variable is included in a first random variable range among the N random variables ranges, and determined as a second access parameter set when the random variable is included in a second random variable range among the N random variables ranges,
wherein the first access parameter includes a first CWmin, a first CWmax and a first AIFS,
wherein the second access parameter includes a second CWmin, a second CWmax and a second AIFS,
wherein the first CWmin has greater value than the second CWmin,
wherein the first CWmax has greater value than the second CWmax, and
wherein the first AIFS has greater value than the second AIFS.

5. The method of claim 1,
wherein the information on the channel state includes information on whether the wireless link is congested,
wherein the information on the channel state indicates that the wireless link is congested when the information of channel state is 1, and
wherein the information on the channel state indicates that the wireless link is not congested when the information of channel state is 0.

6. The method of claim 1,
wherein the frame is either one of a beacon frame or a fast initial link setup (FILS) discovery frame.

7. The method of claim 1 further comprising:
transmitting, by the STA, distributed channel access support information to the AP,
wherein the distributed channel access support information is information on whether the STA performs the channel access by the selecting the one access parameter set among the N access parameter sets, and
wherein the frame includes the N access parameter sets when the distributed channel access support information indicates to support a distributed channel access.

8. A station (STA) that performs scanning in a wireless LAN, the STA comprising:
a radio frequency (RF) unit configured to receive a wireless signal; and
a processor operatively connected to the RF unit configured to:
receive a frame including information on a channel state and N (N>1) access parameter sets from an access point (AP);
select a random variable when the information on the channel state indicates that a wireless link is congested;
select one access parameter set among the N access parameter sets based on the random variable; and
transmit an association request frame to the AP by performing the initial channel access based on the one access parameter set,
wherein each of the N access parameter sets includes information on a contention window minimum (CWmin), a contention window maximum (CWmax) and an arbitration inter-frame space (AIFS) to perform the initial channel access by the STA.

9. The STA of claim 8,
wherein the each of the N access parameter sets corresponds to each of N random variables ranges,
wherein the random variable is included in one random variable range among the N random variables ranges, and
wherein the selected access parameter set corresponds to the one random variable range.

10. The STA of claim 9,
wherein a size of each of the N random variable range is differently determined according to the information on the channel state.

11. The STA of claim 9,
wherein the access parameter set is determined as a first access parameter set when the random variable is included in a first random variable range among N random variable ranges, and determined as a second access parameter set when the random variable is included in a second random variable range among the N random variable ranges,
wherein the first access parameter includes a first CWmin, a first CWmax and a first AIFS,
wherein the second access parameter includes a second CWmin, a second CWmax and a second AIFS,
wherein the first CWmin has greater value than the second CWmin,
wherein the first CWmax has greater value than the second CWmax, and
wherein the first AIFS has greater value than the second AIFS.

12. The STA of claim 8,
wherein the information on the channel state includes information on whether the wireless link is congested,
wherein the information on the channel state indicates that the wireless link is congested when the information of channel state is 1, and
wherein the information on the channel state indicates that the wireless link is not congested when the information of channel state is 0.

13. The STA of claim 8,
wherein the frame is either one of a beacon frame or a fast initial link setup (FILS) discovery frame.

14. The STA of claim 1, the processor is configured to:
transmit distributed channel access support information to the AP,
wherein the distributed channel access support information is information on whether the STA performs the channel access by the selecting the one access parameter set among the N access parameter sets, and
wherein the frame includes the N access parameter sets when the distributed channel access support information indicates to support a distributed channel access.

* * * * *